United States Patent
Walker et al.

[11] Patent Number: 6,158,888
[45] Date of Patent: *Dec. 12, 2000

[54] MATERIALS AND METHODS FOR IMPROVED RADIOGRAPHY

[75] Inventors: James K. Walker; Zhenxue Jing, both of Gainesville, Fla.

[73] Assignee: University of Florida, Gainesville, Fla.

[*] Notice: This patent is subject to a terminal disclaimer.

[21] Appl. No.: 09/075,670

[22] Filed: May 11, 1998

Related U.S. Application Data

[63] Continuation-in-part of application No. PCT/US97/00015, Sep. 5, 1997, which is a continuation-in-part of application No. 08/719,225, Sep. 25, 1996, Pat. No. 5,751,787, which is a continuation-in-part of application No. 08/711,379, Sep. 5, 1996, abandoned.

[51] Int. Cl.$^7$ .................................................. G03B 42/02

[52] U.S. Cl. ........................... 378/169; 378/182; 378/183

[58] Field of Search .................................. 378/167, 169, 378/170, 182–188

[56] References Cited

U.S. PATENT DOCUMENTS

| | | |
|---|---|---|
| 4,394,737 | 7/1983 | Komaki et al. . |
| 4,526,862 | 7/1985 | Pele . |
| 4,737,641 | 4/1988 | Lange et al. . |
| 5,066,864 | 11/1991 | Brandner et al. . |
| 5,352,903 | 10/1994 | Kohda et al. . |
| 5,380,636 | 1/1995 | Malfatto et al. . |
| 5,394,987 | 3/1995 | Markl et al. . |
| 5,574,768 | 11/1996 | McLean . |
| 5,629,968 | 5/1997 | Trauernicht . |
| 5,751,787 | 5/1998 | Jing et al. .............................. 378/169 |

FOREIGN PATENT DOCUMENTS

| | | |
|---|---|---|
| 0581065 | 2/1994 | European Pat. Off. . |

OTHER PUBLICATIONS

Gershon–Cohen, J. (1960) "Technical improvements in breast roentgenogrpahy" Am. J. Roentgenol Radium Ther Nucl Med 84 (2):224–226.

Johns, Paul C. and Martin J. Yaffe (1987) "X–ray characterisation of normal and neoplastic breast tissues" Phys. Med. Biol. 32(6):675–695.

Ma, L., E. Fishell, B. Wright, W. Hanna, S. Allan, N.F. Boyd (1992) "Case–Control Study of Factors Associated with Failure to Detect Breast Cancer by Mammography" J. Natl. Can Inst. 84(10):781–785.

(List continued on next page.)

*Primary Examiner*—David P. Porta
*Attorney, Agent, or Firm*—Saliwanchik, Lloyd & Saliwanchik

[57] ABSTRACT

This invention pertains to novel methods of radiography and novel screen-film cassettes with wide exposure latitude and/or high film contrast for use in radiography. The materials and methods of the subject invention can be used in mammography. In a specific example, this invention concerns the design of novel screen-film cassettes which can use at least one phosphor screen and multiple x-ray films in a single cassette. When used in mammography, this novel design enables additional breast images to be obtained on the faster, or slower, speed film from the same x-ray exposure used to produce a normal breast image on the normal speed film. These additional breast images provide high contrast information on the dense regions of the breast and in the edge areas of the compressed breast. These dense regions currently cause many missed diagnoses in breast cancer screening. The use of this novel multi-screen, multi-film cassette in mammography has the potential to improve the diagnostic accuracy in breast cancer detection, and simultaneously reduce patient breast glandular dose by eliminating unnecessary exposure due to film retake. Obtaining multiple film images of the same object from a single x-ray exposure can apply to many areas of medical and industrial radiography.

46 Claims, 16 Drawing Sheets

OTHER PUBLICATIONS

Maidment, Andrew D.A., Rebecca Fahrig, Martin J. Yaffe (1993) "Dynamic range requirements in digital mammography" Med. Phys. 20(6):1621–1633.

Sanada, Shigeru, Kunio Doi, Xin–Wei Xu, Fang–Fang Yin, Maryellen L. Giger, Heber MacMahon (1991) "Comparison of imaging properties of a computed radiography system and screen–film systems" Med. Phys. 18(3):414–420.

Skubic, Stanley E. and Panos P. Fatouros (1989) "The effect of breast composition on absorbed dose and image contrast" Med. Phys. 16(4):544–552.

Swank, Robert K. (1973) "Absorption and noise in x–ray phosphors" J. Appl. Phys. 44(9):4199–4203.

Wyatt, Carol C. (1980) "Xero and film mammograpjy: two images with one exposure" Radiol. Technol. 51(5):621–625.

MATERIALS AND METHODS FOR IMPROVED RADIOGRAPHY

CROSS-REFERENCE TO RELATED APPLICATIONS

This application is a continuation-in-part of application PCT/US97/15589, filed Sep. 5, 1997; which is a continuation in part of U.S. application Ser. No. 08/719,225, filed Sep. 25, 1996, now U.S. Pat. No. 5,751,787; which is a continuation-in-part of U.S. application Ser. No. 08/711,379, filed Sep. 5, 1996, now abandoned.

The subject invention was made with government support under a research project supported by National Institute of Health (NIH) Grant No. 1R43CA75848-01. The government has certain rights in this invention.

BACKGROUND OF THE INVENTION

Early lesion detection has been shown to significantly reduce breast cancer mortality rates for women over age 50. Screen-film mammography is widely used for early detection of breast cancer. In screen-film mammography, the breast image is formed by recording, on film, the x-ray intensity distribution exiting a compressed breast after exposure of the compressed breast to a uniform x-ray field. The main purpose of mammography is to detect lesions within the breast.

The breast images, or mammograms, are generally obtained from one of two types of screen-film cassettes. The most common screen-film cassette is made of a single phosphor screen, used as a back screen, in combination with a single emulsion film. High image resolution can be achieved because the number of absorbed x-ray photons decreases as a function of depth into the screen. The second type of cassette uses a double emulsion film sandwiched between two phosphor screens. This type of cassette provides higher x-ray absorption efficiency but has a lower spatial resolution. In both cases, only a single film is used.

Unfortunately, there are a number of limitations associated with the use of screen-film cassettes in mammography which reduce its effectiveness in the detection of breast cancer. Specifically, inadequate exposure latitude of the screen-film cassette is a major problem. The exposure latitude of a screen-film cassette is defined as the exposure interval encompassed within the useful optical density range of the film. Inadequate exposure latitude can adversely affect the lesion contrast on a breast image.

The lesion contrast on the breast image is dependent on the subject contrast and the film contrast, which are independent of each other. Subject contrast is determined by the difference in x-ray attenuation between the lesion and its surrounding area, and is therefore a property of the subject for a given x-ray energy. The film contrast is defined as the slope, or as some function of the slope, of the characteristic curve for a film. The characteristic curve, or the H&D curve, is a plot of the optical film density of the processed film as a function of the logarithm of the exposure which effectuated such density (Corney, G. M., 1979). For the same type of film and processing condition, however, the film contrast depends on the film density. FIG. 1 shows the H&D curves of two hypothetical films. These curves demonstrate the fundamental compromise between the film contrast and exposure latitude. That is, the steeper the curve, the higher the film contrast, but the narrower the exposure latitude.

Due to the low image contrast nature of breast lesions on mammograms, high film contrast is required for accurate diagnosis in mammography. The typical film contrast of mammographic x-ray films (e.g., Kodak Min-R films) is about 3.5 for film densities ranging from about 1.0 to 2.0. The corresponding exposure latitudes of these mammographic screen-film cassettes, however, are only about 40. Unfortunately, the film contrast drops quickly for film densities below 1.0 or above 2.0 (Haus, Arthur G., 1992).

It has been shown (Maidment et al., 1993) that the x-ray exposure level arriving at the screen can vary by a factor of 400 in a single radiography of a breast. In part, this variation can occur because the portion of the compressed breast nearest the chest wall is thicker than the portion of the compressed breast furthest from the chest wall. In addition, there can be large variations in breast composition throughout the compressed breast. Current practice in mammographic screening often uses automatic exposure control (AEC) devices to produce a constant film density (~1.5) in the center of the compressed breast. As a result, the film densities around the edge of the compressed breast are much greater than 2.0 due to the excessive x-ray exposure to the screen-film cassette in these areas. Therefore, the film contrast is lower for the edge regions.

A typical radiographic phosphor screen is made of a layer of phosphor coated on a support layer. The structures of conventional radiographic phosphor screens are configured so that light emitted from the phosphor side is optimized for intensity and/or image resolution. For example, typical phosphor screens used in chest radiography have a layer of reflection material between the phosphor layer and support layer to reflect light emitted toward the support side back to the phosphor side. This is to increase the light intensity output from the screen. In mammography, however, conventional phosphor screens are made of a phosphor layer coated on a partially absorbing support layer to absorb the light emitted toward the support side. This is to improve spatial resolution by reducing the light that could be reflected back to the phosphor side. In both cases only light emitted from the phosphor side of the screen is used to expose a film.

The use of more than one film in a single x-ray cassette has been explored for use in mammography (Greshon-Cohen, 1960; C. C. Wyatt, 1980) and other areas of radiography (Sanada et al., 1991; McLean, 1996; Trauernicht, 1997). The critical problem in these systems is that x-ray exposure available for one film is significantly less than that for the other film(s). This difference in x-ray exposure level leads to a difference in x-ray quantum noise levels so that the imaging performance of the film which uses the lowest x-ray exposure may be limited by noise. The use of light emerging from both sides of a self-supporting phosphor layer has been disclosed for use in general radiography (Komaki et al., 1983), where each film is exposed by light emerging from at least two phosphor screens located on either side of the film. These screen-film combinations, used in general radiography, require on the order of 60–100 kV, which requires thick phosphor screens to adequately interact with a sufficient fraction of the x-rays. In addition, the quality of the resulting film images can suffer from image noise due to fluctuation in the number of x-rays absorbed in each of the multiple screens, as well as high levels of Swank noise [10] due to significantly different amounts of light incident on the film for each of the multiple screens. Furthermore, in order to have self-supporting phosphor sheets, Komaki et al. disclose the use of phosphor sheets having thicknesses in the range of 70–300 $\mu$m and preferably 100–150 $\mu$m, which is also consistent with the requirements imposed by the high-energy, 60–100 kV, x-rays as discussed above.

In mammography, mis-diagnosis frequently occurs when a breast lesion is surrounded by dense fibroglandular tissue (Skubic and Fatouros, 1989; Ma et al., 1992). In this case, the subject contrast is very small due to the subtle difference in x-ray attenuation between the lesion and fibroglandular tissue (Johns and Yaffe, 1987). Additionally, the lower x-ray penetration in these regions can cause low film densities and therefore low film contrast. The low subject contrast combined with the low film contrast makes proper diagnosis more difficult. Consequently, some lesions can go undetected, or in the case of an ambiguous diagnosis the patient is often required to undergo reexamination. This results in additional exposure to ionizing radiation as well as additional psychological stress.

The detection of breast cancer is particularly problematic for young women whose breasts typically have high fibroglandular content. Therefore, in the detection of lesions, higher than normal film contrast is particularly desirable. Unfortunately, with the existing state of the art cassettes, this would correspond to an unacceptably low exposure latitude. There is therefore a need for a cassette which can provide higher than normal film contrast with no corresponding unacceptable drop in exposure latitude. Such a cassette would be particularly advantageous in the routine mammographic scanning of women under the age of 50.

It is therefore desirable to develop new methods and screen-film cassettes with wide exposure latitude and/or high film contrast in order to improve the diagnostic accuracy in early breast cancer detection. Such a development could further reduce breast cancer mortality for all women as well as reduce the need for reexamination of the patient and thus reduce patient exposure to ionizing radiation.

BRIEF SUMMARY OF THE INVENTION

The subject invention pertains to novel methods of medical and industrial radiography and novel screen-film cassettes with wide exposure latitude and/or high film contrast for use in radiography. The materials and methods of the subject invention are particularly advantageous for use in mammography. In a specific example, this invention concerns the design of novel screen-film cassettes which can use at least one phosphor screen and multiple x-ray films in a single cassette. Advantageously, the subject invention can utilize light emitted from both sides of a phosphor layer to expose a film on each side. In another embodiment, the screen can be a scintillation fiber optic plate. The combination of screens and films, in the subject invention, produces effective film speeds which can vary by, for example, a factor of at least two between the lowest and highest speed films. In a specific embodiment, the present invention concerns the design of a single screen-dual film cassette which is based on a novel concept of using light emerging from the phosphor side and the transparent backing layer of a phosphor screen to expose two single emulsion x-ray films. There are at least two ways in which the subject invention can be exploited.

First, a cassette can have an effective exposure latitude at least about a factor of two wider than current screen-film cassettes, while maintaining a film contrast as high as current cassettes. When this novel cassette is used in mammography, in addition to a normal breast image obtained on the standard, normal speed film, at least one additional breast image is obtained on the faster, or slower, speed film from the same x-ray exposure. Advantageously, these novel screen-film cassettes allow the dense regions and/or edge areas of the compressed breast to be displayed with high film contrast. This property of imaging dense regions is of interest in all mammographic procedures but is particularly advantageous in procedures for women under the age of 50.

Second, a cassette of the subject invention can have an effective exposure latitude about the same as current cassettes, while having a film contrast of at least about a factor of two greater than current screen-film cassettes. This allows higher image contrast for lesions surrounded by dense fibroglandular tissue. This property is of interest in all mammographic procedures.

A specific embodiment of this invention concerns the design of a cassette which contains one moveable phosphor screen and two films which can be exposed simultaneously by the phospher screen. The screen is fabricated to emit light from its two faces and can be held in a plane by a frame which is hinged at its attachment to the cassette. The two films, after exposure, can be read by a digital scanner which can be connected to a computer. The two digital image files can then be processed by the computer to search for the presence of pre-cancerous or cancerous lesions. In the past, such computer programs have been of limited value due to the high rate of false positive indications. The present invention provides two images for computer aided diagnosis and thereby greatly reduces stochastic contributions to the false positive identifications. The present invention thereby provides computer aided diagnosis with a high diagnostic sensitivity and a low rate of false positive indications. This computer-aided diagnosis can be of assistance to a radiologist who can also perform a visual diagnosis directly from the films.

The use of these novel screen-film cassettes can significantly improve diagnostic accuracy in breast cancer detection. The design more efficiently uses the x-ray exposure and scintillation light emitted by the phosphor screen(s) to generate an increased amount of important diagnostic information, with no corresponding increase in patient radiation risk.

DETAILED DESCRIPTION OF THE INVENTION

The subject invention pertains to novel methods of radiography and novel screen-film cassettes with wide exposure latitude and/or high film contrast for use in radiography. The materials and methods of the subject invention are particularly advantageous for use in mammography. In a specific example, the subject invention concerns the design of novel screen-film cassettes which use at least one phosphor screen and multiple x-ray films in a single cassette. In another embodiment, the screen can be a scintillating fiber optic plate. The combination of screens and films, in the subject invention, produces effective film speeds which can vary by, for example, a factor of at least about two between the lowest and highest speed films. There are at least two ways in which the subject invention can be exploited.

First, a cassette can have an effective exposure latitude at least about a factor of two wider than current screen-film cassettes, while maintaining a film contrast as high as current cassettes. When this novel cassette is used in mammography, in addition to a normal breast image obtained on the standard, normal speed film, at least one additional breast image is obtained on the faster, or slower, speed film from the same x-ray exposure. Advantageously, these novel screen-film cassettes allow the dense regions and/or edge areas of the compressed breast to be displayed with high film contrast.

Second, a cassette of the subject invention can have an effective exposure latitude about the same as current cassettes, while having a film contrast of at least about a factor of two greater than current screen-film cassettes. This allows higher image contrast for lesions surrounded by dense fibroglandular tissue. Although this property is of interest in all mammographic procedures, this property can be particularly advantageous in mammographic procedures for women under the age of about 50.

The present invention relates to a method of employing light emitted from both sides of a radiographic phosphor screen to expose two films. In a preferred embodiment of the subject invention, a radiographic phosphor screen comprising a layer of phosphor coated on a transparent support layer is utilized. In an alternative embodiment, this phosphor screen can be replaced by a scintillating fiber plate which outputs light from two sides.

Figure 4:
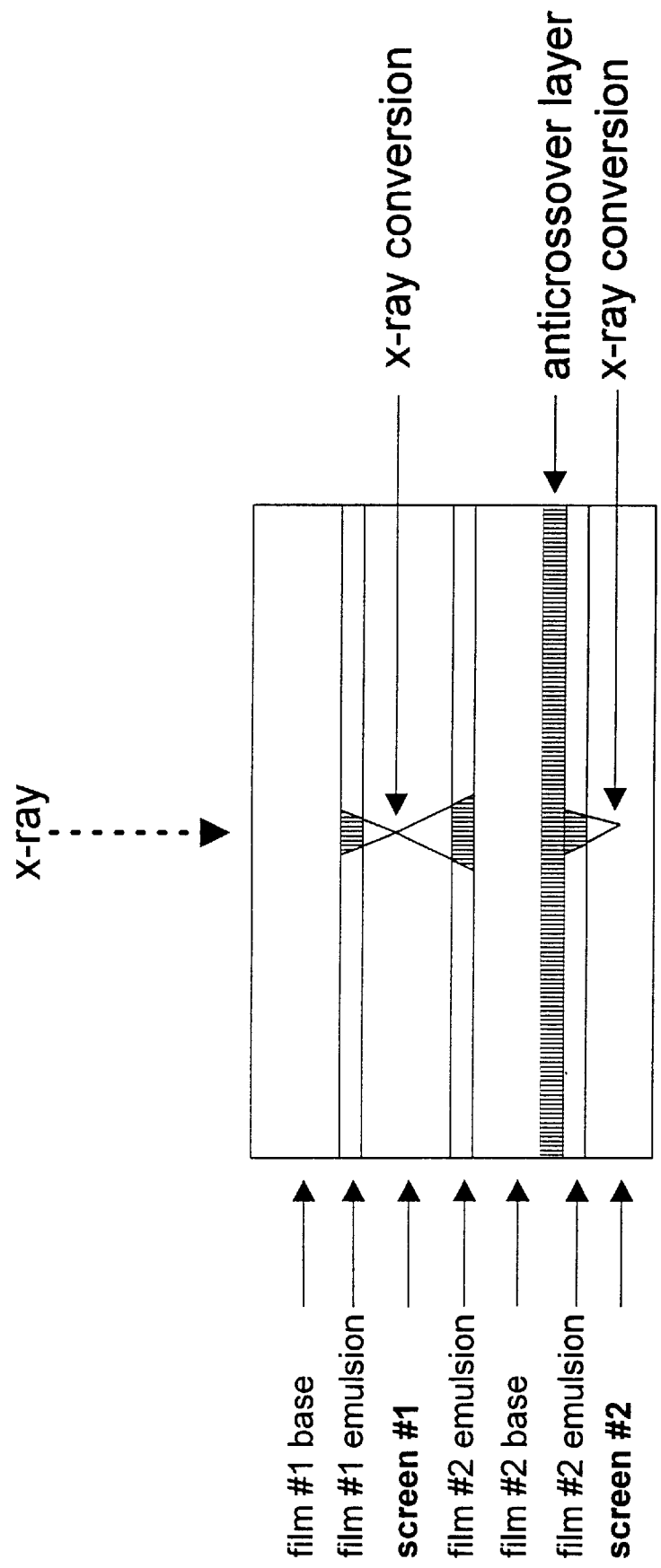
FIG. 4 shows a cross section of a novel dual screen-dual film cassette.

In a preferred embodiment of the subject invention, light emitted toward the transparent screen support is utilized to simultaneously produce a second image in addition to the first image produced from light emitted from the phosphor side. Accordingly, the second film image can have the same x-ray quantum noise level as the first image. In a specific embodiment, a double emulsion film is sandwiched between the transparent screen support side and a second high resolution screen. The second screen is used to improve the spatial resolution performance of the double emulsion film. In addition, this second screen also reduces speed requirement and the quantum noise level of the double emulsion film. In a specific embodiment, the second screen can have a reflective layer to reflect light back to the double emulsion film, thereby improving the speed of the double emulsion film. If in addition, the second film is exposed by a second screen, as illustrated in FIG. 4, then the x-ray quantum noise level of the second film can be less than that obtained on the first film.

The image resolution of the film exposed by light emerging from the transparent backing layer of the screen is affected by the thickness of the transparent backing layer. There are at least two ways to optimize the spatial resolution for images produced from light emitted toward a transparent screen support. First, one can reduce the transparent screen support thickness. However, the transparent screen support should preferably be strong enough to support the screen. Another way to optimize spatial resolution is to add light absorbing dye in the screen support to reduce light dispersion. The drawback to adding dye is that the dye also reduces light output from the screen support side and may require the use of higher speed film, thereby increasing film noise. It is also possible to combine these two ways of improving the second film resolution. In a specific embodiment, the transparent screen support can be doped with light absorbing dye and have a thickness which provides adequate screen strength and resolution.

In a specific embodiment, the present invention concerns the design of a single screen-dual film cassette which is based on a novel concept of using light emerging from the phosphor side and the transparent backing layer side of a phosphor screen to expose two single emulsion x-ray films. The present invention can utilize thin screens because of the very low x-ray energies employed in mammography. The present invention can employ screen thicknesses in the range 25 to 110 $\mu$m, and preferably in the range of 25 to 70 $\mu$m. The subject invention also pertains to unique ways of handling screens in this range of thickness, due to the need for support of the screens during handling. This embodiment of the present invention, wherein a first film is exposed by light emerging from a first side of a screen and a second film is exposed by light emerging from a second side of the same screen, can have many advantages over the previous methods.

First, the cassette can have the same x-ray absorption properties as the standard mammography cassette. For example, a typical screen can absorb on the order of 70% of the x-rays, allowing sufficient x-rays to reach the AEC device for proper functioning without increasing the x-ray dosage. This can result in the same amount of x-rays being available to the automatic exposure control (AEC) devices in the x-ray unit. The subject cassette can, therefore, be exchanged with the existing cassettes in the current clinical environment. Second, the two films are each exposed by light resulting from x-rays which are absorbed in the single phosphor screen, such that the image noise due to fluctuation in the number of x-rays absorbed is approximately the same for both films. In addition, the inherent image Swank noise [Swank, 1973] in the subject films can also be reduced compared to the prior methods in which each film is exposed by more than one phosphor screen such that significantly different amounts of light can be incident on each film from different screens.

Figure 13:
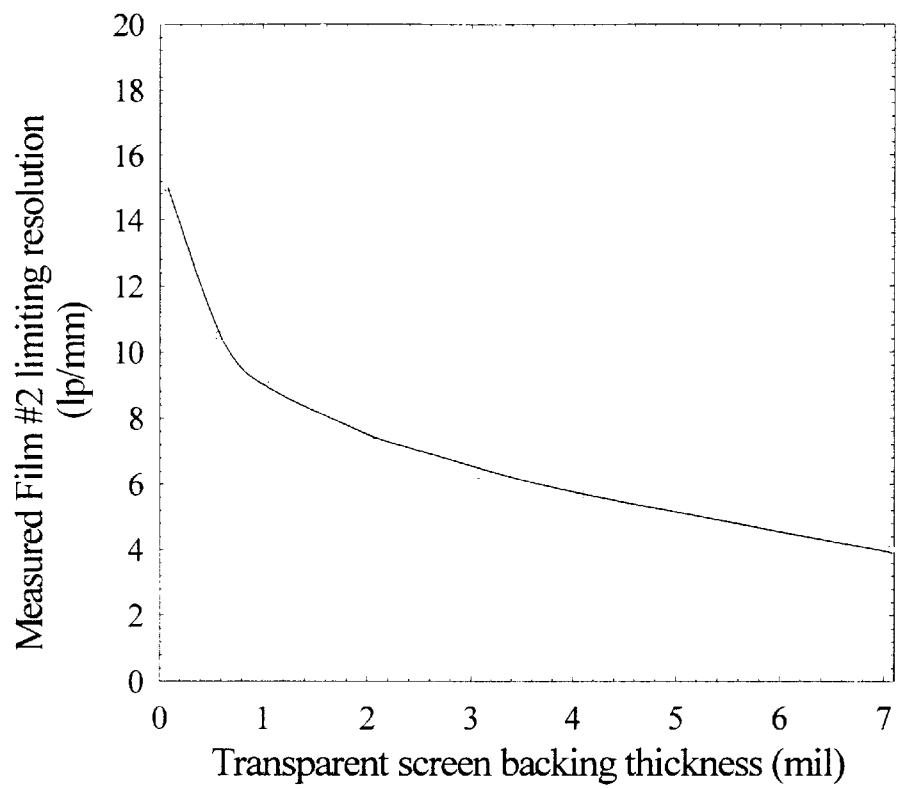
FIG. 13 shows a graph representing the relationship between measured limiting spatial resolution for a film exposed by light emerging from the transparent backing layer of a screen as a function of the transparent backing layer thickness for the case where the screen is placed between the radiation source and the film.

FIG. 13 shows the measured film limiting spatial resolution as a function of the transparent screen backing thickness for a specific screen-film geometry where the screen is between the x-ray tube and the film. The screen phosphor is a layer of $Gd_2O_2S$:Tb phosphor with 34.0 mg/cm$^2$ coating weight and physical thickness of about 55 $\mu$m. FIG. 13 shows that a limiting spatial resolution of $\geq$10 lp/mm for the film exposed from the screen backing side in the above mentioned geometry can only be achieved when the screen transparent backing thickness is less than about 0.7 mil or 17.8 $\mu$m (1 mil is about 25.4 $\mu$m).

In this specific case, the total thickness of the screen is composed of three parts:

1. A screen protective layer of about 2 to 4 $\mu$m.
2. A phosphor/binder layer having a thickness of about 55 $\mu$m. This thickness is regarded as close to optimal for mammography. Increasing the thickness reduces the spatial resolution, and decreasing the thickness increases the required radiation exposure to the patient.
3. A transparent backing layer of less than about 17.8 $\mu$m. This thickness restriction is preferred to achieve a limiting spatial resolution of $\geq$10 lp/mm.

This results in a total screen thickness of about 75 $\mu$m. A spatial resolution of 10 lp/mm for the second film is regarded as a lower limit for acceptable mammographic diagnosis sensitivity. It is desirable for diagnostic mammographic reasons to achieve a higher limiting spatial resolution. This can be done by reducing the thickness of the phosphor/binder layer and/or the thickness of the transparent backing. It can be seen from FIG. 13 that the limiting resolution is a very sensitive function of the backing thickness, for a given phosphor/binder layer thickness. Likewise, the limiting resolution is a very sensitive function of the phosphor/binder layer thickness for a given backing thickness. Because of this extreme sensitivity, it is desirable to make the screen with a slightly thinner phosphor/binder layer and a thinner transparent backing. A thinner phosphor/binder layer can be achieved either by, for example, utilizing a slightly lower coating weight than 34.0 mg/cm$^2$ or a slightly lower ratio of binder to phosphor for the same coating weight. Typical ratios of binder to phosphor employed in screen production are selected in the range 1 to 1.5. In a specific embodiment, a screen having a slightly reduced coating weight of 27.2 mg/cm$^2$ and a slightly reduced backing thickness of 8 $\mu$m for a total screen thickness of 54 $\mu$m provided a limiting resolution of about 16 lp/mm for the film exposed from the transparent backing side of the screen. Accordingly, a preferable range of screen thickness is from about 25 to about 75 $\mu$m for optimizing limiting resolution.

In a specific embodiment, a screen can be designed to select protective layer thickness, phosphor layer thickness, and transparent backing layer thickness such that the same limiting resolution (lp/mm) is achieved for each film. In this case, the backing layer would be thicker and would face the x-rays, since most of the x-rays tend to be absorbed near the portion of the phosphor layer nearest the incoming x-rays.

In a specific embodiment of the subject invention, the binder utilized for the phosphor/binder layer can be a polymer. When the phosphor layer is thick enough, the polymer can enable the phosphor screen to have adequate structural integrity when its solvent has evaporated. Examples of such a polymer include: polyvinyacetate, polyurethane, polyvinylchloride, polyvinyltriacetylcellulose, polysiloxane, and copolymers thereof. The phosphor/binder layer can be made by forming a mixture of the above binder and phosphor particles in a suitable volatile solvent. This mixture can be cast on a flat plate, for example a teflon plate, which has low adhesion to the binder. When the solvent has evaporated the phosphor/binder layer can be removed, for example peeled off the plate. A protective polymeric layer of, for example, 2–4 $\mu$m and a transparent backing layer of less than 12.7 $\mu$m 17.8 $\mu$m can then be added to the phosphor/binder layer. This transparent backing layer can be as thin as 2–4 $\mu$m, sufficient to provide adequate protection for the phosphor/binderlayer. The protective polymeric layer and backing polymeric layer are preferably formed from polyethylene terephalate. Other polymers may also be used, for example, polyvinylacetate, polyurethane,polyvinylchloride,polyvinyltriacetylcellulose, polysiloxane, and copolymers thereof.

The use of these novel screen-film cassettes can significantly improve diagnostic accuracy in breast cancer detection. The design of the cassettes more efficiently uses the x-ray exposure and scintillation light emitted by the phosphor screens to generate an increased amount of important diagnostic information, with no corresponding increase in patient radiation risk.

Figure 9:
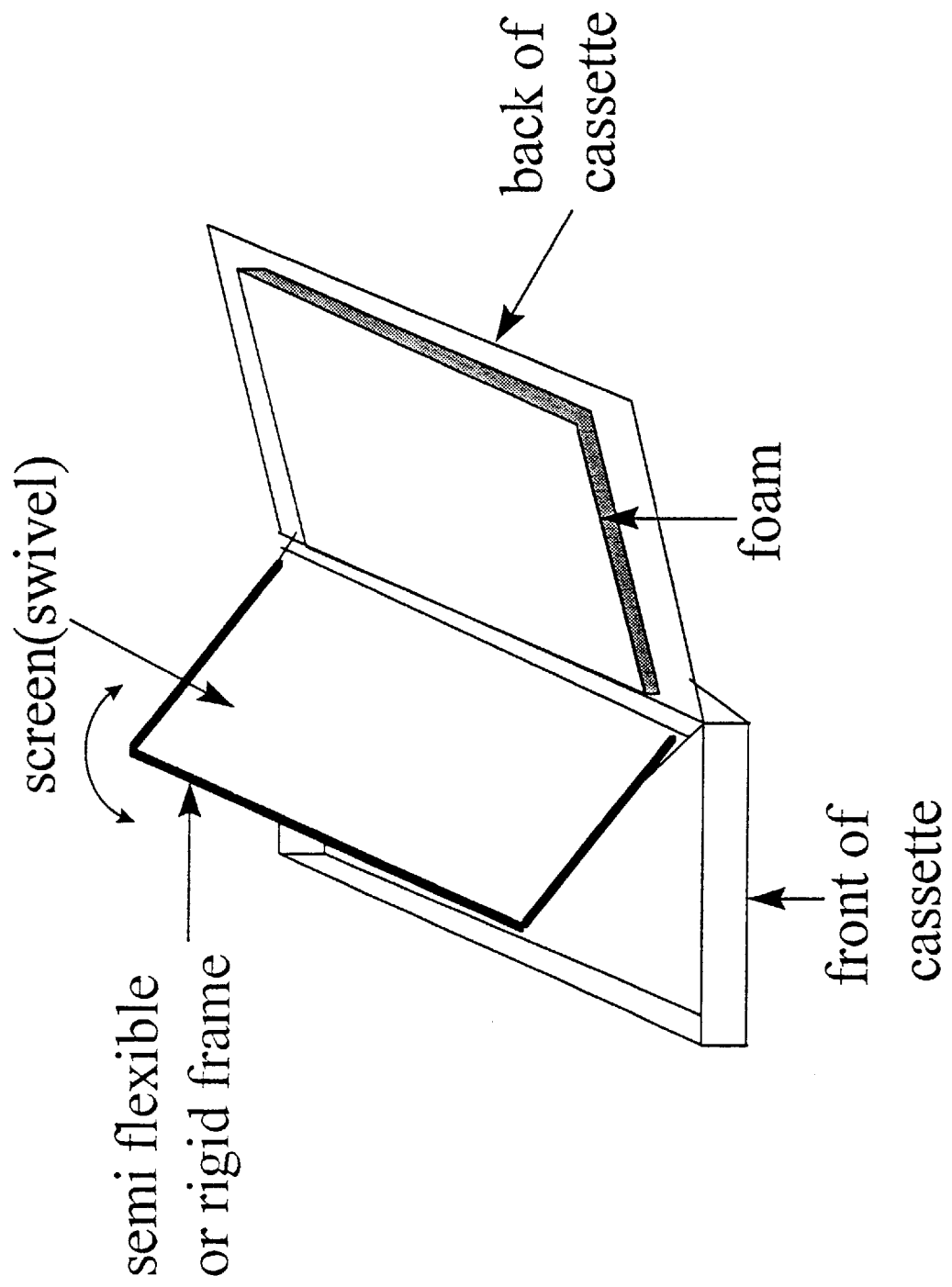
FIG. 9 shows a film cassette in accordance with the subject invention.
Figure 10:
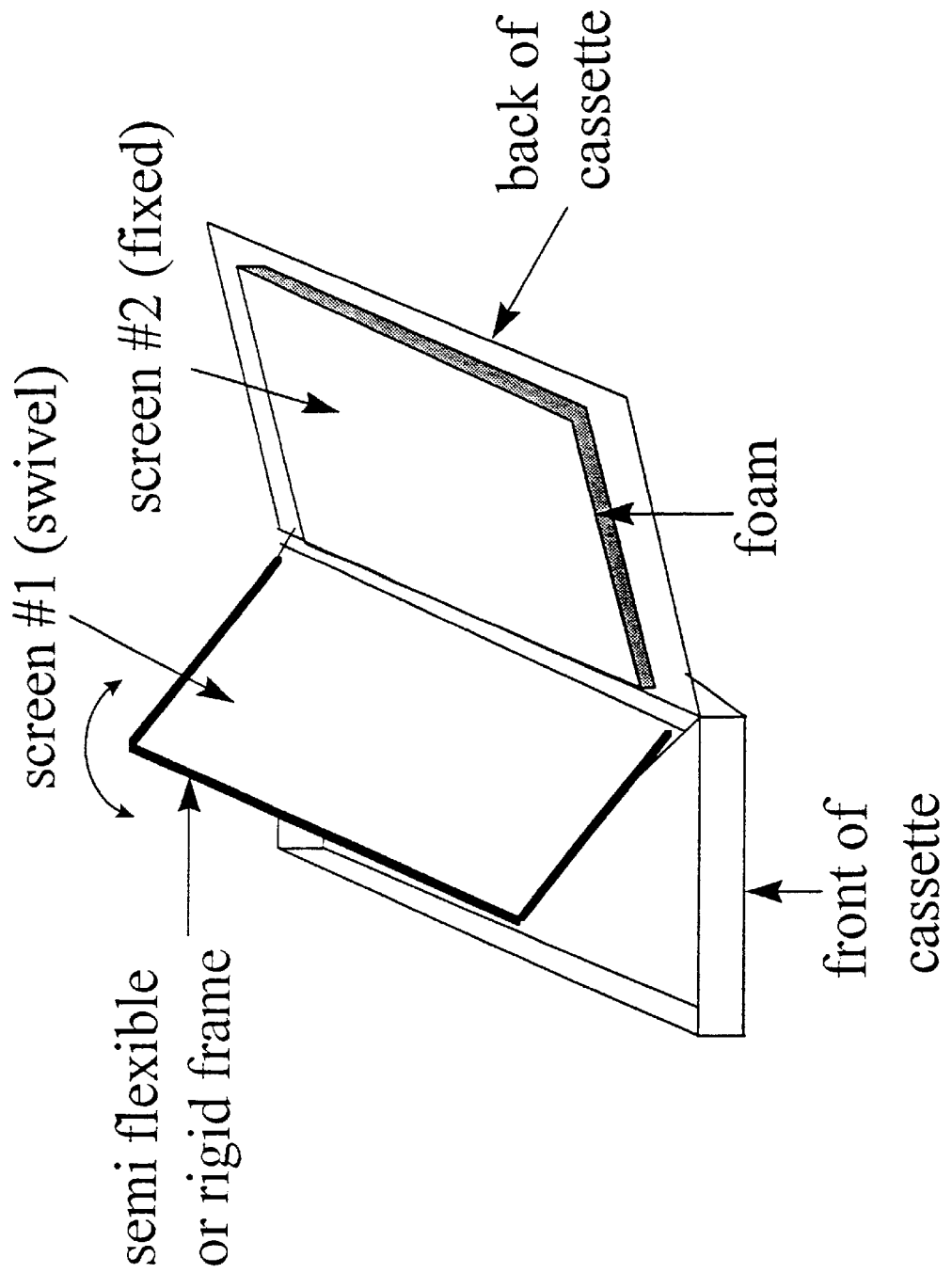
FIG. 10 shows a film cassette in accordance with the subject invention.

The novel cassettes of the subject invention can be designed such that the screens remain in the cassette, while the films can be introduced and removed during the radiographic procedure. The screen(s) are typically very thin, flexible under their own weight, and susceptible to damage if touched. Therefore, care must be taken during the introduction and removal of the films to ensure the integrity of the screen(s). In a specific embodiment, referring to FIGS. 9 and 10, the screen(s) are connected to the cassette such that the screen(s) can move out of the way during introduction and removal of the film(s). is connection can be, for example, along at least one edge of, or at a corner of, the screen. Additionally, for more physical strength, the screen can have a semi-flexible or rigid frame on at least one edge, which can then be connected to the cassette.

Figure 12:
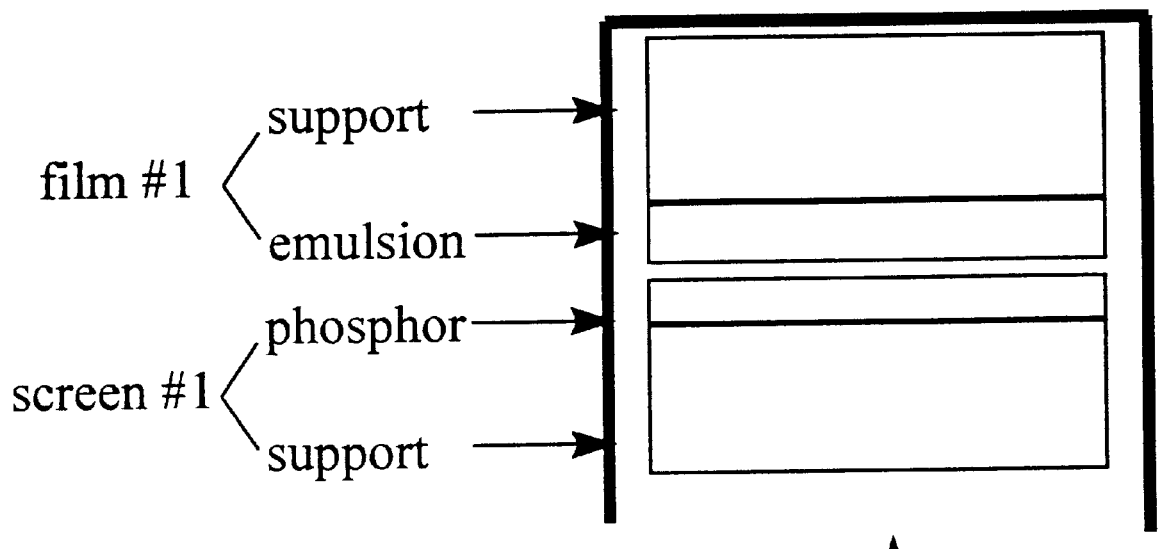
FIG. 12 shows a film cassette comprising sub-cassettes, in accordance with the subject invention.
Figure 12:
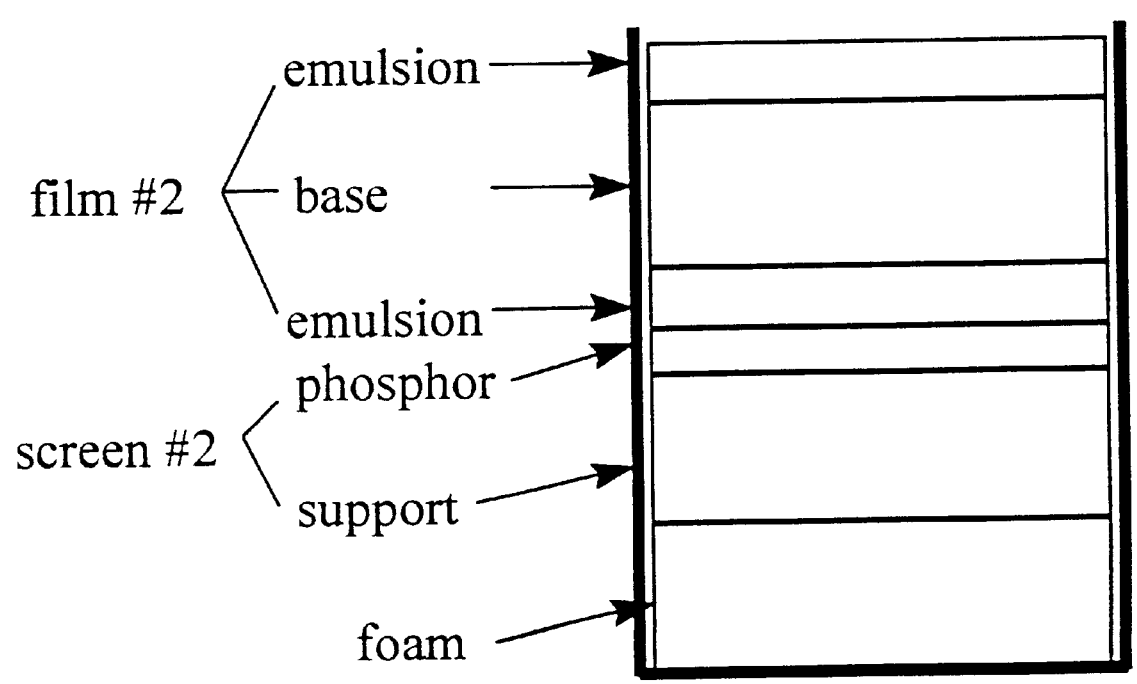

Alternatively, referring to FIG. 12, the novel cassettes of the subject invention can be designed such that one or more of the screen(s) can be removed from the cassette as well as allowing the films to be removable. To protect the physical integrity of the screen, the screen can have a semi-flexible or rigid frame on at least one edge, thus providing a mechanism for holding the screen during introduction and removal of the screen from the cassette. A frame can be utilized which supports the screen, for example along three of its four sides. In this way, the screen can be kept taut and flat due to the forces imparted on it by the frame. The frame can be connected, for example through a hinge, along one of the frame sides to a cassette within which films may be disposed for exposure. The frame may be united with the screen by any one of several methods or combination thereof.

In a specific embodiment, the screen can be made slightly larger than required in its final form and maintained in a taut condition by an external stretching jig. A frame can then be attached to the taut screen by glue or other attachment means. The excess screen surrounding the frame can then be removed and the screen maneuvered by means of the frame to insert it into the cassette for subsequent use. In another embodiment, the screen can be made to its final dimensions. The screen can then be heated, for example to about 50° C., before the screen and frame are joined. The framed screen can then be brought to room temperature at which time the screen is suitably taut within the frame. Alternatively, the frame can be cooled, for example to −40° C., before the screen and frame are joined. Again, the screen and frame can then be brought to room temperature at which time the screen is suitably taut within the frame.

Figure 14A:
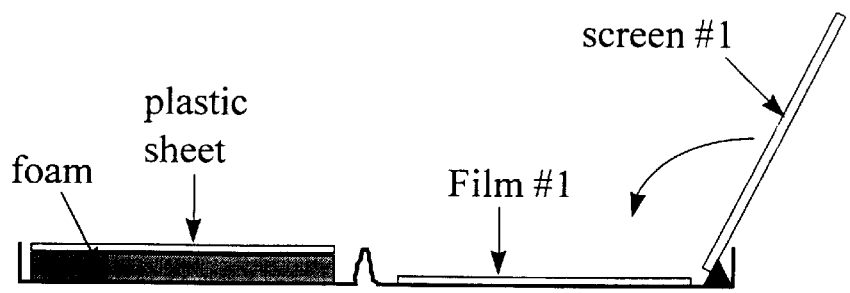
FIG. 14A shows a specific embodiment of a single screen-dual film cassette where the screen can shift positions to allow for the removal and placement of films with respect to the cassette.
Figure 14B:
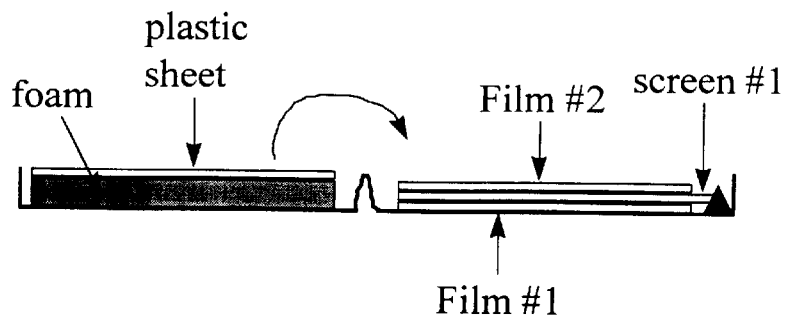
FIG. 14B shows the cassette of FIG. 14A with both films loaded and indicates, via an arrow, how the cassette closes to ready for radiation exposure.

In a specific embodiment, a novel single screen-dual film cassette can be made where the screen is connected to the cassette such that the screen can be moved out of the way during introduction and removal of the films. FIGS. 14A and 14B show a specific embodiment of such a cassette in accordance with the subject invention. Referring to FIG. 14A, film #1 can be loaded such that the screen can be folded down to cover film #1. Film #2 can then be placed on top of the screen as shown in FIG. 14B. The left-hand side of the cassette can then be folded over on top of film #2, to close the cassette for subsequent use.

In a specific embodiment, the screen can be bonded to a three sided frame, for example made of plastic, which can then be connected to the cassette edge. In this embodiment, in the process of loading and unloading films, a technologist can hold the plastic frame to flip the screen, protecting the screen from direct physical contact and excessive bending. The plastic frame can also incorporate a difference in size between the two sides of the frame. This difference in size can permit different types of film to be loaded on each side of the frame such that each type of film can only be loaded into position on the proper side of the frame. Similarly, the film orientations can be uniquely determined, for example by their shape and the unique way they fit into the plastic frame.

Alternatively, the novel cassettes of the subject invention can be designed such that the cassettes comprise sub-cassettes each of which comprises at least one screen and can accommodate at least one film. These sub-cassettes can be attached together for the radiographic imaging procedure, and detached for storage, changing films, and/or reconfiguring these sub-cassettes. In this way many combinations of screens and films may be achieved by attaching these sub-cassettes together.

In a specific embodiment, when two or more films are exposed at one time, for example by x-rays, the two or more films, after processing, can each be read by a digital scanner. This digital scanner can be, for example, connected to a computer. In a more specific embodiment, the two or more digitized image files can then be analyzed and processed by a computer to produce a composite digital image file.

When forming a composite digital image file from two or more individual digital image files, there may be a slight difference in the magnification of each individual digital image file used, due to the small differences in the distance of each film from the x-ray source. These differences in magnification should be taken into account when forming a composite digital image file. In a specific embodiment, in order to synthesize the individual images into a composite image, the individual digitized images can be scaled to a given image size, for example, that of the first film image.

Figure 11:
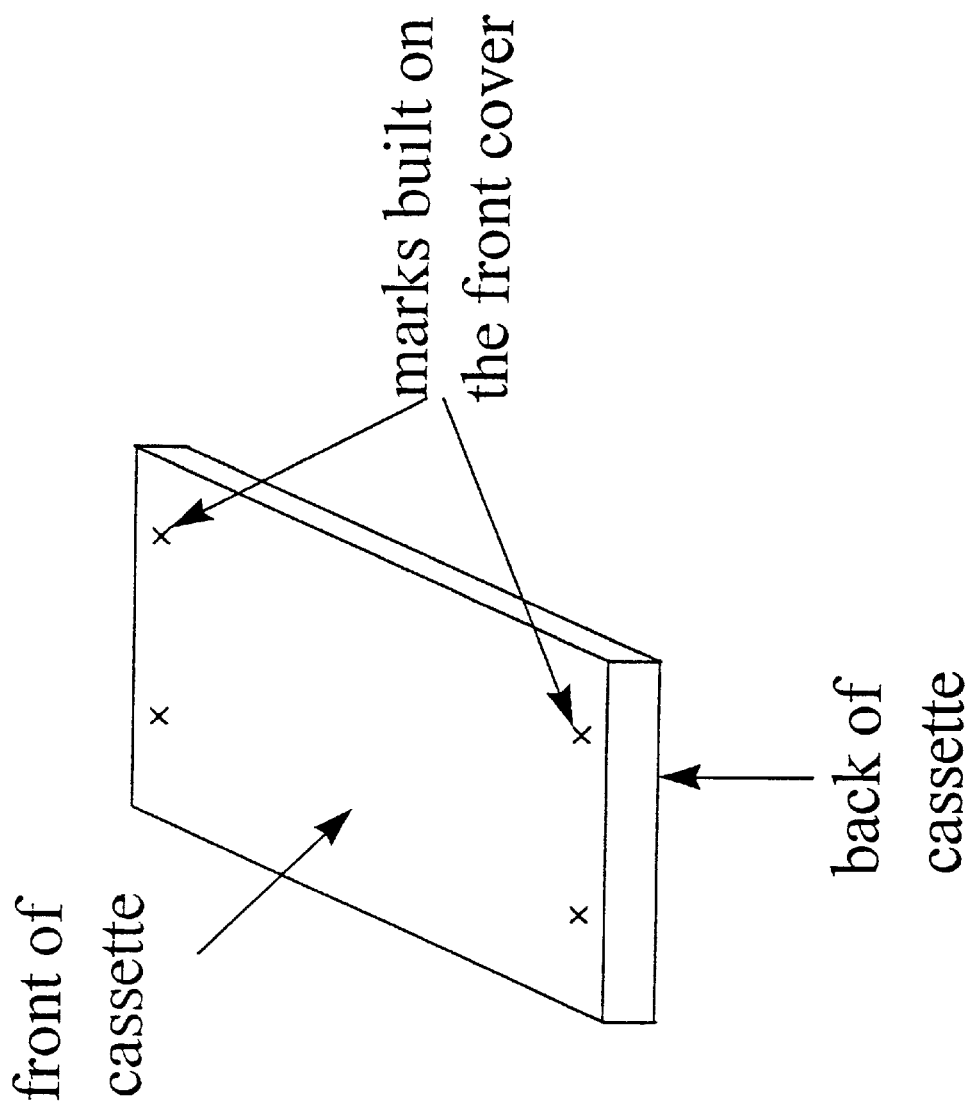
FIG. 11 shows a film cassette comprising fiducial marks.

In a specific embodiment, referring to FIG. 11, this scaling can be accomplished by using at least one fiducial mark. In a preferred embodiment, the fiducial mark(s) can be located around the edge of each image. The mark(s) can be produced in each film image, for example, by very small (less than or equal to 25 microns) high density insert(s). These insert(s) can be fixed in the cassette, preferably in the front cover, which holds the films during the exposure to x-ray thereby creating the mark(s) in the film image when the film is exposed to x-rays. A scaling algorithm can first be applied to scale each of the individual digitized images to align the fiducial marks of the individual digitized images corresponding to the different films. The same algorithm can then be applied to the digitized images themselves.

The H & D characteristics of the films used to produce the individual digitized film images, which are known for each film, can be encoded and therefore incorporated into the computer program which processes the individual digital images. Thereafter, each individual film's digitized image can be analyzed pixel by pixel in order to adjust each pixel's grey level for the non-linearity of that film's response derived from the film's H & D curves. In a specific example having two films, for a pixel $(i,j)_1$ of film #1 having a non-linearity correction less than a prescribed user defined value, pixel $(i,j)_c$ of the composite image will have grey scale information determined by starting with the grey scale information of $(i,j)_1$ and adjusting for the corresponding non-linearity correction. However, for a pixel $(i,j)_1$ having a non-linearity correction greater than a prescribed user defined value, pixel $(i,j)_c$ can have its grey scale information obtained from another film, for example, pixel $(i,j)_2$ of film #2. In this case, the speed of film #2 has been chosen such that there is a small non-linearity correction required for its corresponding pixel, $(i,j)_2$. The grey scale value of pixel $(i,j)_2$ in film #2 is then scaled by the difference in the measured speed between films #1 and #2 and the resulting grey scale value is used for the pixel $(i,j)_c$ in the composite image. This process can be carried out for all pixels and can be extended to the use of more than two films.

Figure 3:
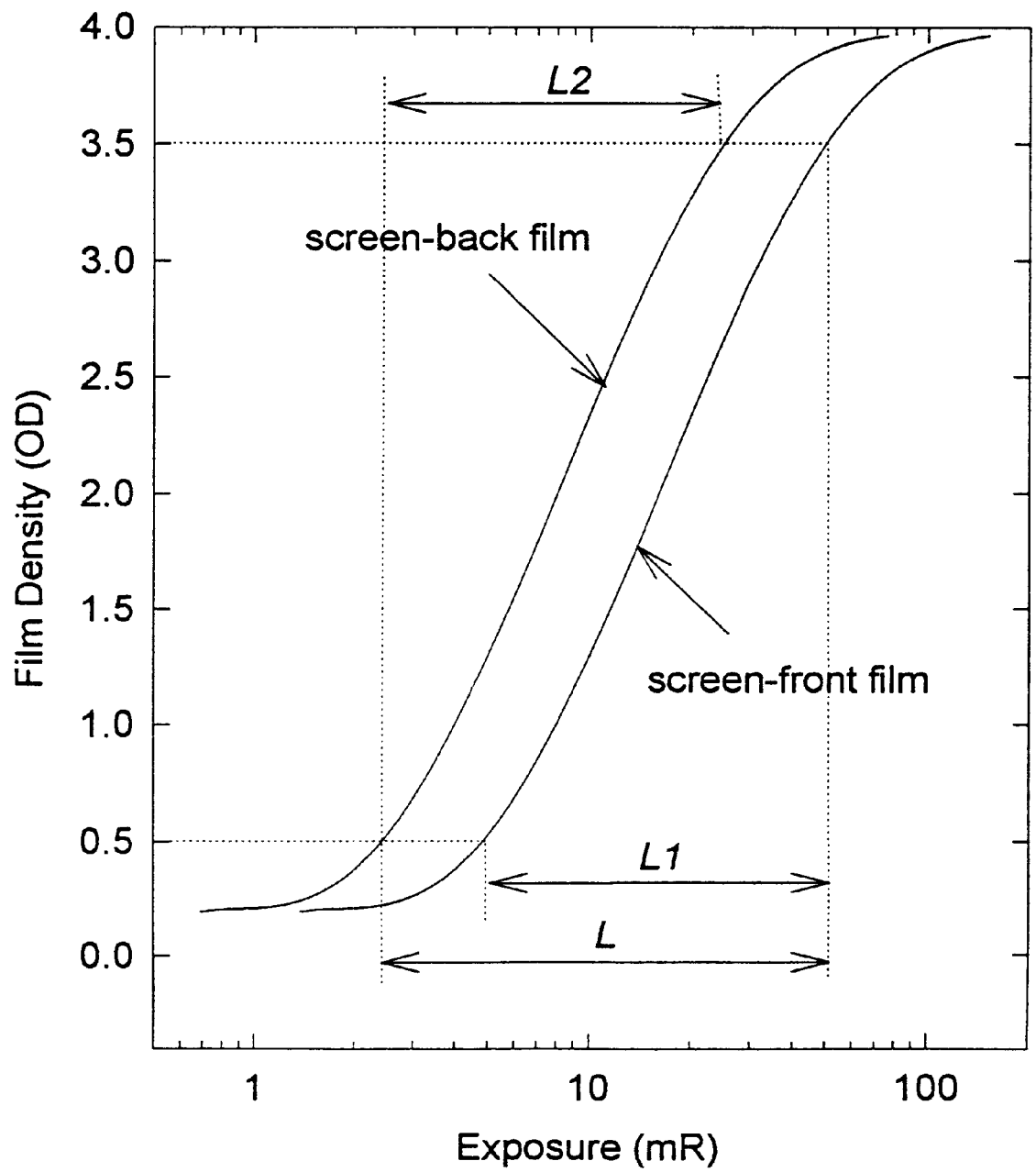
FIG. 3 shows the H&D curves of a single screen-dual film cassette.

The result of this digital processing is the creation of a single composite digitized image which has high resolution, high contrast, and wide latitude. The latitude L, of the composite digitized image is related to the latitudes $L_1$, $L_2$, ..., $L_n$ of the individual film images, where n is the total number of films taken. In a specific embodiment having two films, the latitude, L, of the composite digitized image is related to the latitudes, L1 and L2, of the individual film images as shown in FIG. 3. Thus the latitude, L, is bounded by the extremes of the individual latitudes of the individual film images.

In a specific embodiment, the subject invention can be an integrated system. Within this integrated system, two or more films can be exposed by one or more screens upon exposure of a subject to x-rays. Fixed within a cassette housing the screens and films, there can be a marking means, for example, very small high density inserts, which create fiducial marks on all of the films when the cassette is exposed to x-rays. The films can then be processed and then digitized, for example, by a digital scanner. These digital images, although already very valuable for radiographic purposes, can be further processed by, for example, a computer. This computer can have a scaling and alignment algorithm, correlated with the fiducial marks, whereby the film images of the different films are scaled to a common size and aligned with each other. Once the multiple film images are commonly scaled and aligned with each other, these digitized film images can be analyzed pixel by pixel in order to adjust each pixel's grey level for the non-linearity in that film's response derived from the film's H & D curves. In this way, a composite image can be constructed, wherein each pixel of the composite image utilizes a corresponding pixel of a film having a non-linearity correction less than a prescribed user defined value. The grey level of the selected pixel is then adjusted to correct for the non-linearity of that film's response, for the selected pixel. This process can be carried out for all pixels, to produce a composite which incorporates the optimum part of each of the multiple films' images. Thus a single digital image can be produced which has a latitude covering the extremes of the partially overlapping latitudes of the individual films.

Once a composite digital image is produced, this composite digital image can be used to perform computer assisted diagnosis. For example, this composite digital image can be transmitted by telephone wire lines, fiber optic lines, radio, and other like communication links for remote diagnosis. In addition, this composite digital image can be stored on magnetic or optical disks, or other like digital archiving media for subsequent analysis or interpretation.

In a specific embodiment, the two films, after processing, can be read by a digital-scanner. This digital-scanner can be, for example, connected to a computer which processes the digital images. The processing can include an image scaling and alignment algorithm correlated with fiducial marks on the images produced, for example, by high density inserts in the cassette. Accordingly, the two digital images can be scaled and aligned with each other in this way. Each digital image can then be processed by specialized algorithms to search for the presence of image features indicative of the presence of tissue abnormality of the subject, for example pathological imaging features associated with breast cancer.

A common difficulty encountered when searching digital mammographic images for pathological imaging features is a poor signal to noise ratio, especially with respect to the detection of micro-calcifications. A major contribution to the "noise" can be the presence of foreign matter, for example dust, on the film, either during the mammographic procedure or during the digital scanning procedure. In addition, graininess of the film can also contribute to the "noise" level. When a single image is searched, as with current mammographic methods, these contributions to the "noise" level can lead to an unacceptably high number of false positives in the detection of micro-calcifications. Advantageously, the subject invention can provide two images, each of which provides separate identifications of micro-calcifications. The contributions to the two images from the light emerging from the screen should be correlated, while the contributions to the two images from foreign matter on the films and the graininess of the films should not be correlated. Accordingly, it is less likely for dust and film graininess to produce a false positive identification at the same location on both images. Therefore, combining the diagnostic information from each image, the number of false-positives can be substantially lowered without reducing the sensitivity for detection of true-positive identifications. While this is particularly true and important for the detection of micro-calcifications, it is also true for the detection of small mass lesions and other indications of cancer.

The two digitized images can be combined to provide a single digitized image. The combining algorithm can seek to maximize the signal to noise ratio for each pixel. The combined digital image can also be processed to search for pathological imaging features. The diagnostic results from the combined image can be compared with those from each of the two individual images to provide a final, for example computer aided, diagnosis to the radiographer. In this way, a computer based "second opinion" is available to the radiographer which can be superior to any currently available.

Following are examples which illustrate procedures for practicing the invention. These examples should not be construed as limiting.

EXAMPLE 1

Figure 1:
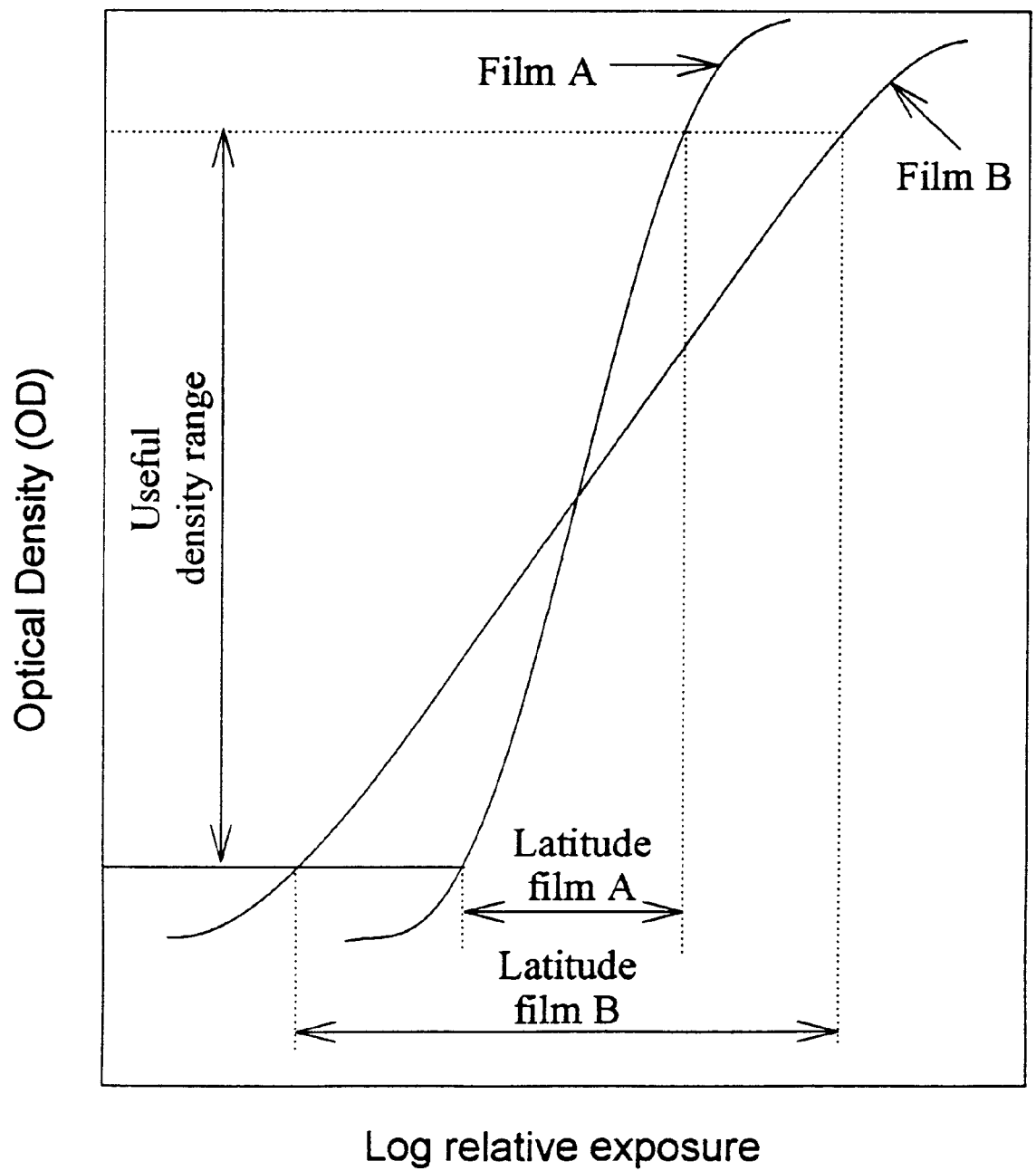
FIG. 1 shows characteristic curves of two hypothetical radiographic films.
Figure 2:
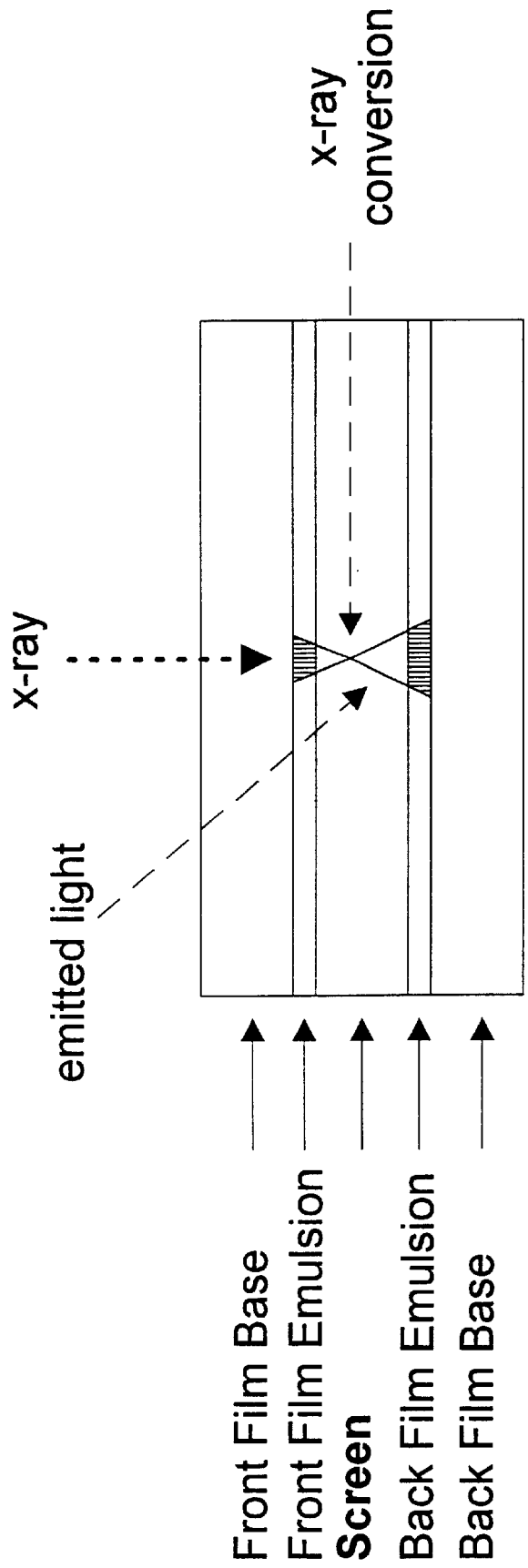
FIG. 2 shows a cross section of a novel single screen-dual film cassette.

A Single Screen-Dual Film Cassette with Improved Lesion Detection in Dense Breast Regions or Compressed Breast Edge Areas A novel single screen-dual film combination is shown in FIG. 2. Compared to current mammographic screen-film cassettes, the design adds a second film to the back of the phosphor screen. In this combination, two film images are obtained from a single x-ray exposure.

The key to enable this design to be used in screen-film mammography is to select the two film speeds so that their latitudes are partially overlapped. FIG. 3 shows the H&D curves of the two films in the single screen-dual film combination where the horizontal axis is the x-ray exposure in units of milliroentgen (mR). The screen can be the Min-R type available from Kodak.

The screen-front film combination is relatively slow in speed compared to the screen-back film combination. The latitudes of the screen-front film and screen-back film combinations are L1 and L2, respectively. The fact that two film images can be produced from a single x-ray exposure results in an effective latitude of L for the single screen-dual film combinations. Preferably, the film contrast of the two films is similar so that the high contrast requirement for breast cancer detection is always satisfied.

The H&D curve of the screen-front film combination can be the same as that of a typical screen-film combination (such as Kodak Min-R Screen/Min-RE Film) currently used in mammography. It produces breast images that are essentially the same as those obtained from current screen-film combinations. The film densities of the dense breast regions often are low on these images. The resulting image contrast of these dense breast regions is generally low.

The H&D curve of the screen-back film combination is designed to extend the film exposure latitude to lower x-ray exposure levels especially in the dense regions of the breast. The response of the screen-back film to x-ray exposure is made to be a factor of about two faster than the screen-front film. For example, a film such as Kodak Min-R H, which has a speed of 1.8 times Kodak Min-R E, meets the requirement. As a result, the dense breast regions have higher film density. The corresponding film contrast is higher than that on the front film. The lesion detectability in the dense breast regions can therefore be improved. This is an important characteristic of this single screen-dual film cassette.

Alternatively, it is also possible to use a slow speed back film so that the H&D curve of the screen-back film moves to a higher exposure level. The response of the screen-back film to x-ray exposure, in this case, may be made to be about a factor of two slower than the screen-front film. As a result, the edge areas around the compressed breast have lower film density. The corresponding film contrast in these areas is higher than that which appears on the front film. Films of other speeds can be obtained or readily prepared by those skilled in the art.

EXAMPLE 2

A Single Screen-Dual Film Cassette with Improved Lesion Detection in the Uniformly Compressed Breast Regions This novel single screen-dual film cassette can have the same structure as shown in FIG. 2. However, the cassette employs a special screen and a special type of film. In this design, the special screen is designed such that the light exiting the back of the screen is about half of that exiting the front of the screen. The same type of films can be used at both sides of the screen. These special films have about half of the film exposure latitude of the standard Kodak Min-R type films, and have significantly higher film contrast.

The effective exposure latitude of this novel single screen-dual film cassette is therefore about the same as that of current screen-film combinations. Advantageously, the contrast for the uniformly compressed breast regions is significantly higher than current screen-film combinations. This improvement in film contrast will enable very low contrast lesions to be seen with enhanced sensitivity in mammography screening.

The use of this novel single screen-dual film cassette is particularly of benefit for mammography of women under the age of 50 whose breasts are composed of mostly fibroglandular tissue.

EXAMPLE 3

Figure 5:
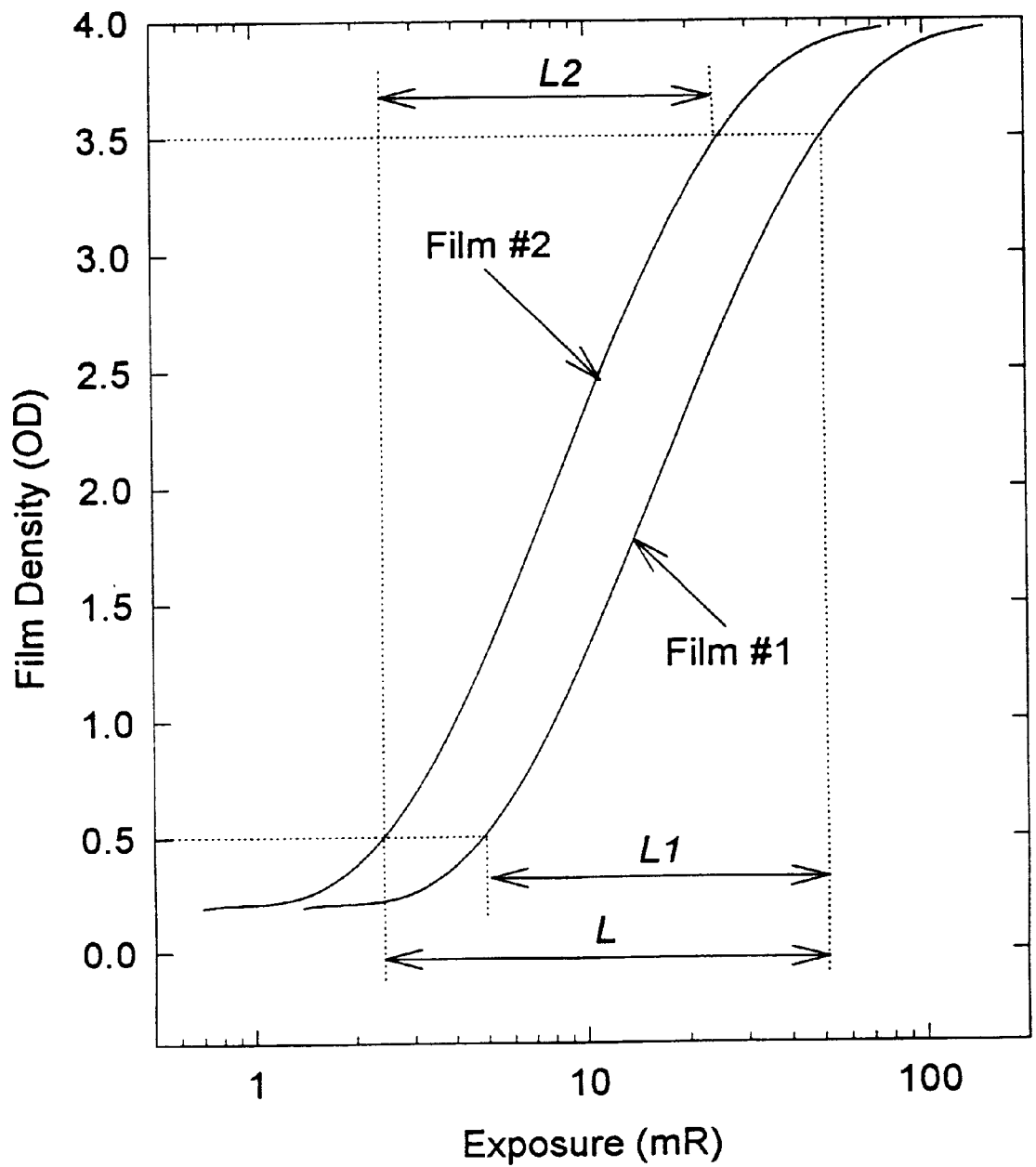
FIG. 5 shows the H&D curves of a dual screen-dual film cassette.

A Dual Screen-Dual Film Cassette with Improved Lesion Detection in Dense Breast Regions A novel dual screen-dual film cassette is shown in FIG. 4. FIG. 5 shows the H&D curves of the two film responses. Film #1 produces breast images that are essentially the same as those obtained from current screen-film combinations. The response of film #2 to x-ray exposure is also a factor of about two faster than film #1. As in Example 1, the choice of film #1 may be Kodak Min R E. However, film #2 is a double emulsion film with an anticrossover layer, for example, Kodak IMG film.

Screen #2 is added to absorb the x-rays penetrating screen #1. This design makes more efficient use of the x-ray exposure to produce high film densities of the dense breast regions on the second film.

EXAMPLE 4

Figure 6:
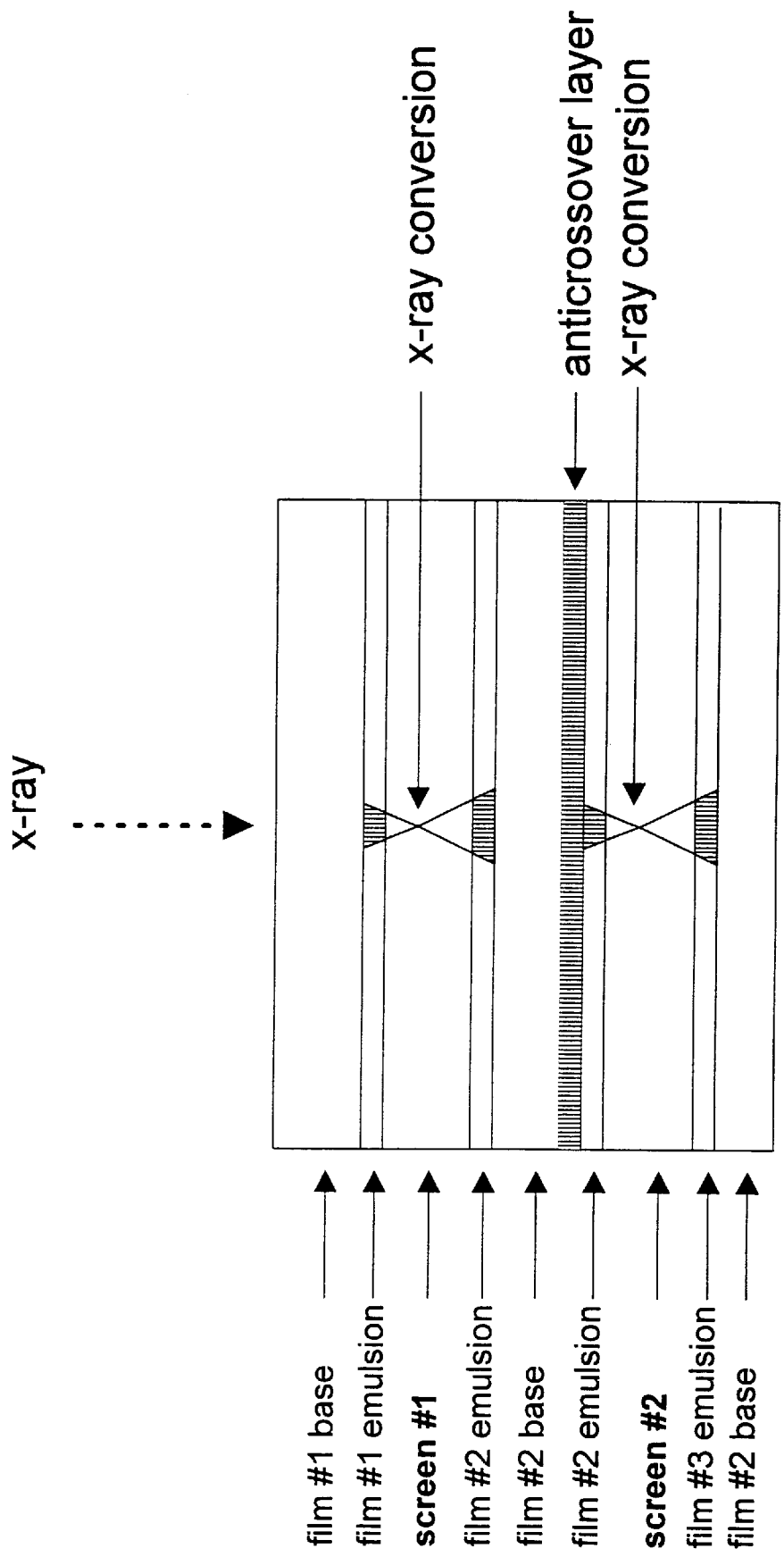
FIG. 6 shows a cross section of a novel dual screen-triple film cassette.

A Dual Screen-Triple Film Cassette with Improved Lesion Detection in Both Dense Breast Regions and Compressed Breast Edge Areas A novel dual screen-triple film cassette is shown in FIG. 6.

Figure 7:
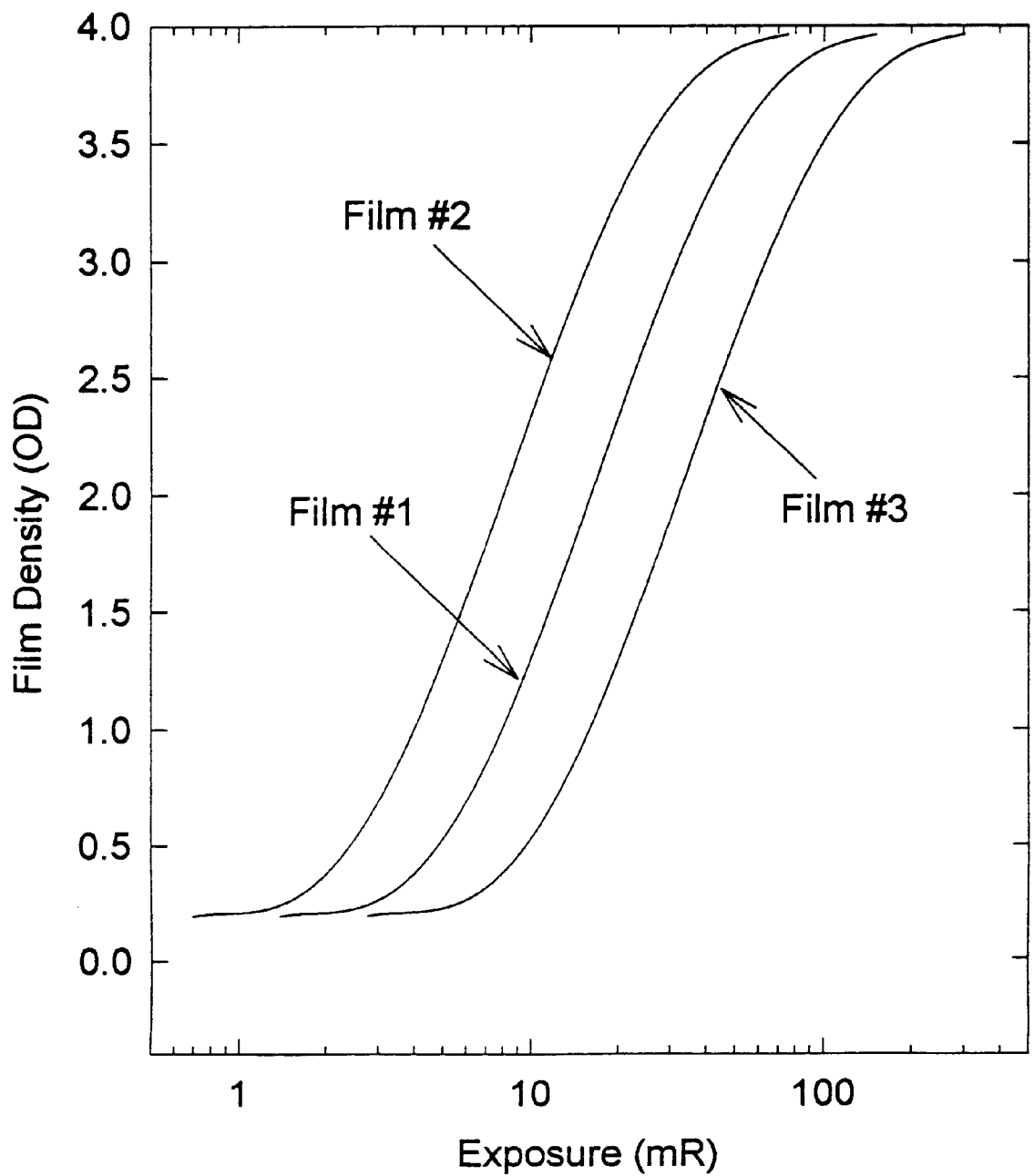
FIG. 7 shows the H&D curves of a dual screen-triple film cassette.

The screens #1 and #2 and films #1 and #2 are the same combinations as discussed in Example 3 and shown in FIG. 4. Additionally, film #3 is identical to film #1 in this design. For the x-ray energies used in mammography, a phosphor screen has a typical x-ray absorption efficiency of about 50% to 70%. The x-ray exposure to screen #2 as shown in FIG. 6 is corresponding lower than the x-ray exposure to screen #1. The effective speed of the screen #2 and film #3 combination is therefore about 2 to 3 times less than that of film #1. The resultant H&D curves for the three films are shown in FIG. 7.

This novel dual screen-triple film cassette therefore has an effective exposure latitude which is about four times wider than current screen-film combinations.

EXAMPLE 5

Figure 8:
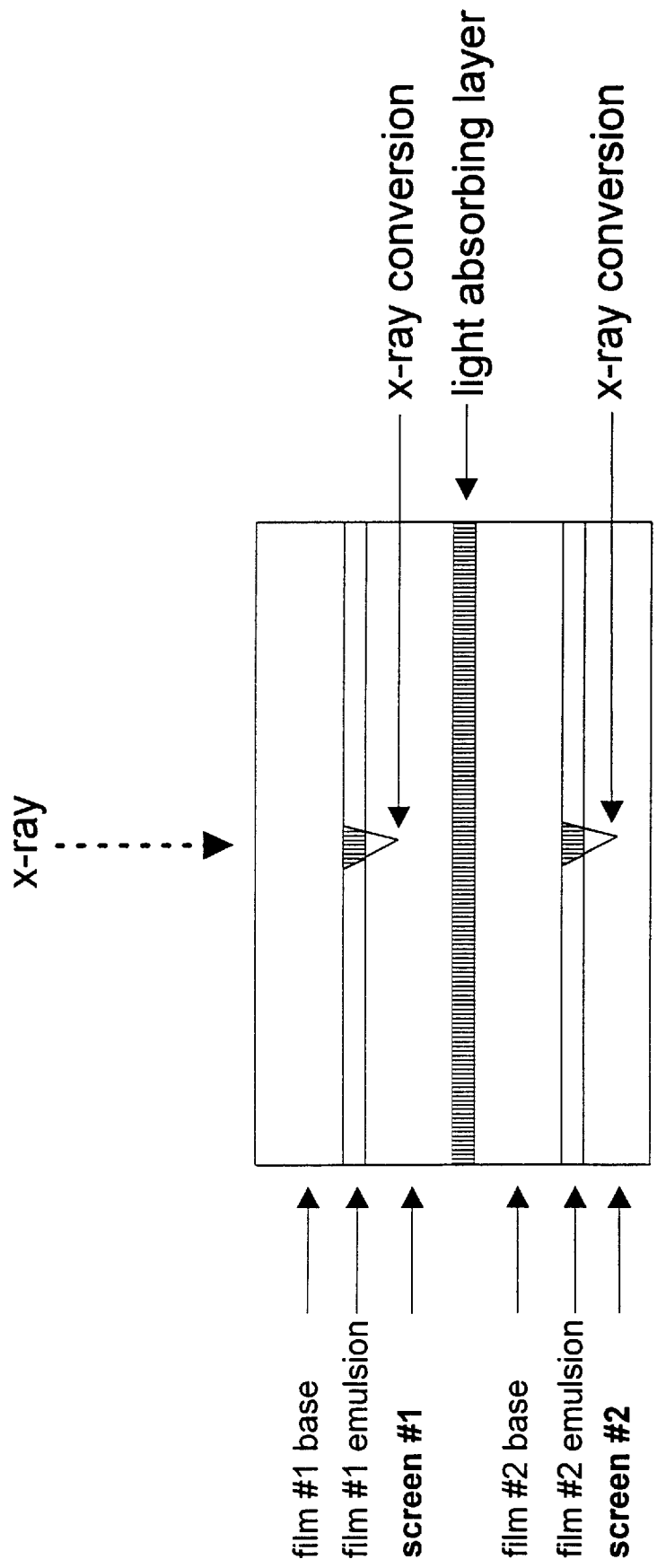
FIG. 8 shows a cross section of a novel dual screen-dual film cassette.

A Dual Screen-Dual Film Cassette with Improved Lesion Detection in Compressed Breast Edge Areas or in Dense Breast Regions A novel dual screen-dual film cassette is shown in FIG. 8. Screen #1 can be, for example, a Kodak Min-R, and Screen #2 can be a Kodak Min-R or a Kodak Min-R medium. Films #1 and #2 are identical, and can be, for example, Kodak Min-R E. The screen #1 film #1 combination produces the normal breast image. Because the x-ray exposure to the screen #2/film #2 combination is about half of the exposure to the screen #1/film #1 combination, a relatively lower density image is obtained on film #2. In this way, the contrast sensitivity is improved in the compressed breast edge area.

An alternative approach with this dual screen-dual film cassette is to produce a normal breast image on film #2. The dense regions of the breast will then be displayed with high contrast on film #1.

EXAMPLE 6

A Dual Screen-Dual Film Cassette with Improved Lesion Detection in the Uniformly Compressed Breast Regions This novel dual screen-dual film cassette can have the same structure as shown in FIG. 8. Screen #1 used in this design can be, for example, the Kodak Min-R screen. Screen #2 can either be the Kodak Min-R screen or the Kodak Min-R medium screen. The choice of screen #2 is determined by the x-ray energy used in mammography. The goal is to generate about an 2:1 ratio in the light output from that of screen #1 to that of screen #2. The special high contrast films, as mentioned in Example #2, may be used in this design. In this way, the effective exposure latitude of this novel dual screen-dual film cassette will be about the same as current screen-film combinations. Improved lesion detectability is again achieved through the use of high contrast films.

EXAMPLE 7

Figure 15:
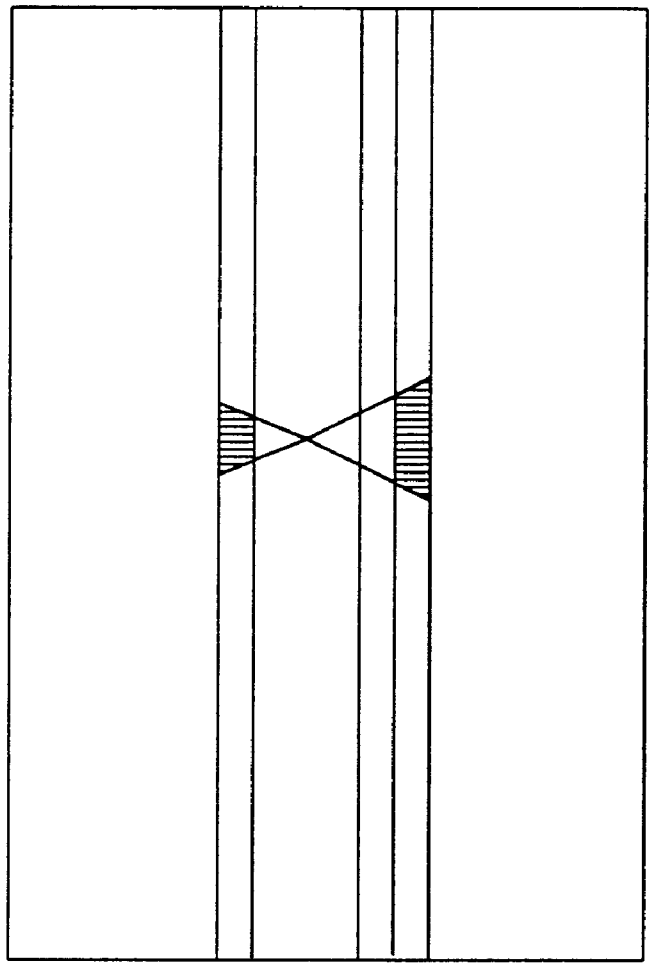
FIG. 15 shows a cross section of a novel single screen-dual film cassette wherein the screen comprises a phosphor layer and a transparent backing layer, in accordance with the subject invention.

A Single Screen-Dual Film Cassette with Improved Lesion Detection in Dense Breast Regions FIG. 15 shows the cross sectional view of a single screen-dual film combination. This combination is composed of one phosphor screen sandwiched between two single emulsion films. Light emitted toward the front of the screen is used to expose Film #1. Film #2, on the other hand, is exposed by light emerging from the transparent backing layer of the screen. The table below summarized the compositions of the films and screens for the single screen-dual film combination used in this study.

| Material | Compositions |
| --- | --- |
| Film #1 | Kodak Min-R E film, single emulsion |
| Screen #1 | $Gd_2O_2S$:Tb (27.2 mg/cm$^2$ coating weight) formed on a 8 μm thick polymeric sheet |
| Film #2 | Kodak Min-R H film, single emulsion |

A conventional Kodak Min-R screen-Min-R E film combination was used as a standard for comparison. Each screen-film combination was loaded into a corresponding Kodak Min-R2 cassette. A GE Senograph 600t mammography x-ray unit was used to expose the cassettes. The x-ray tube has a molybdenum (Mo) anode and an added 0.03 mm Mo filter. A large focal spot size of 0.3 mm and a focal spot to screen-film cassette distance of 65 cm were used. All the films were developed in a Kodak X-Omat processor operating at 95° F. and using extended processing cycles.

Figure 16B:
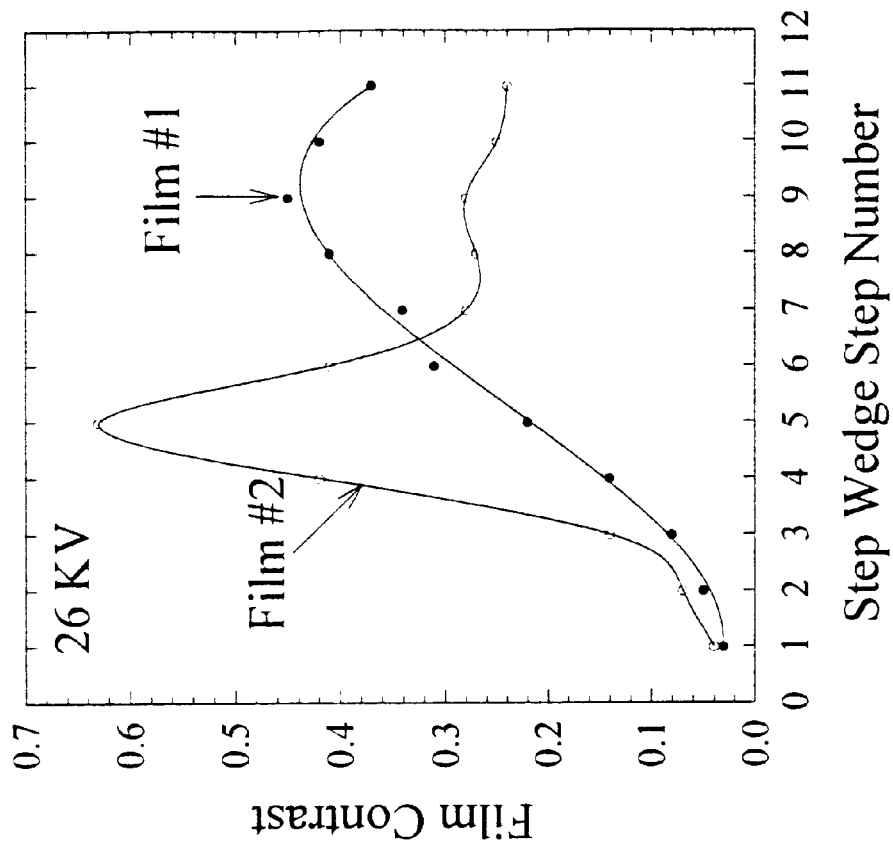
FIG. 16 shows characteristic curves and the corresponding film contrast for a specific single screen-dual film system measured at an x-ray tube potential of 26 kV.
Figure 16A:
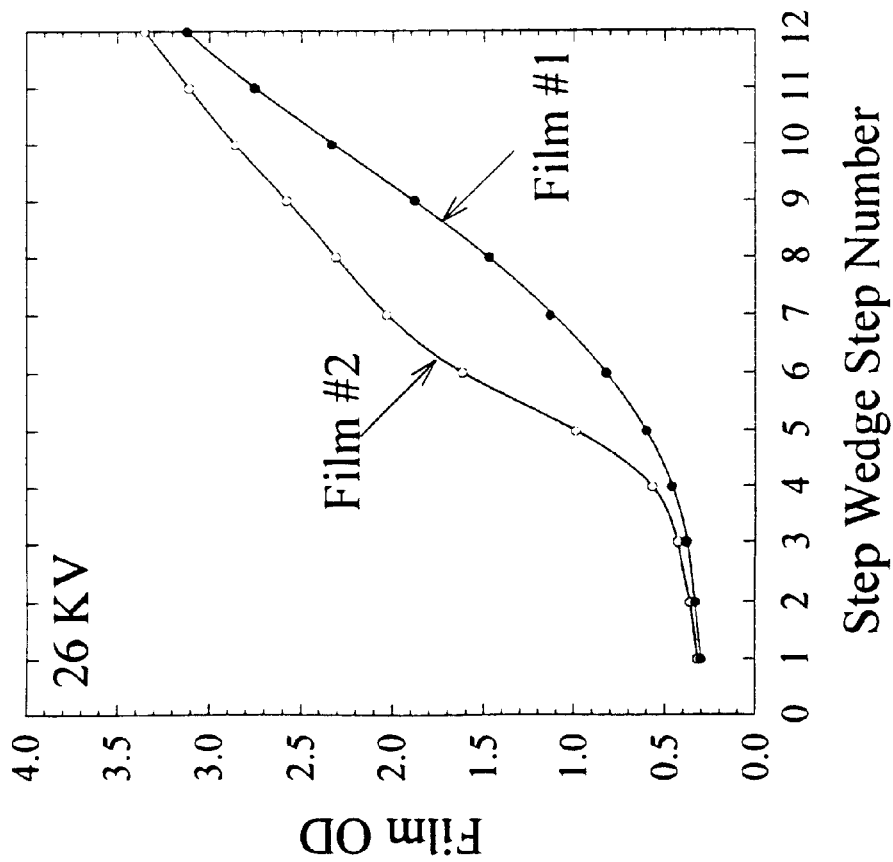

The characteristic curves of the single screen-dual film system were measured from the images of an aluminum step wedge. FIG. 16 shows the measured film optical density (OD) and the corresponding film contrast (defined as the difference in OD between two successive steps) as a function of step wedge number at the x-ray tube potential of 26 kV. The film OD values were measured on the center of each step of the aluminum step wedge image. FIG. 16 shows that in the film #1 OD range between ~0.5 to 0.7, the contrast of film #2 is a factor of ~3 greater than the contrast of film #1.

The response of film #2 to cassette x-ray exposure is a factor of about two faster than film#1. For the dense breast regions where penetrating x-rays are less, the x-ray exposure to the cassette will typically produce film OD under 1.0 on film #1. The corresponding film OD on film #2 will be higher and in the optimal region where film contrast is high. This improved film contrast increases the lesion detectability in the dense breast regions.

Figure 17:
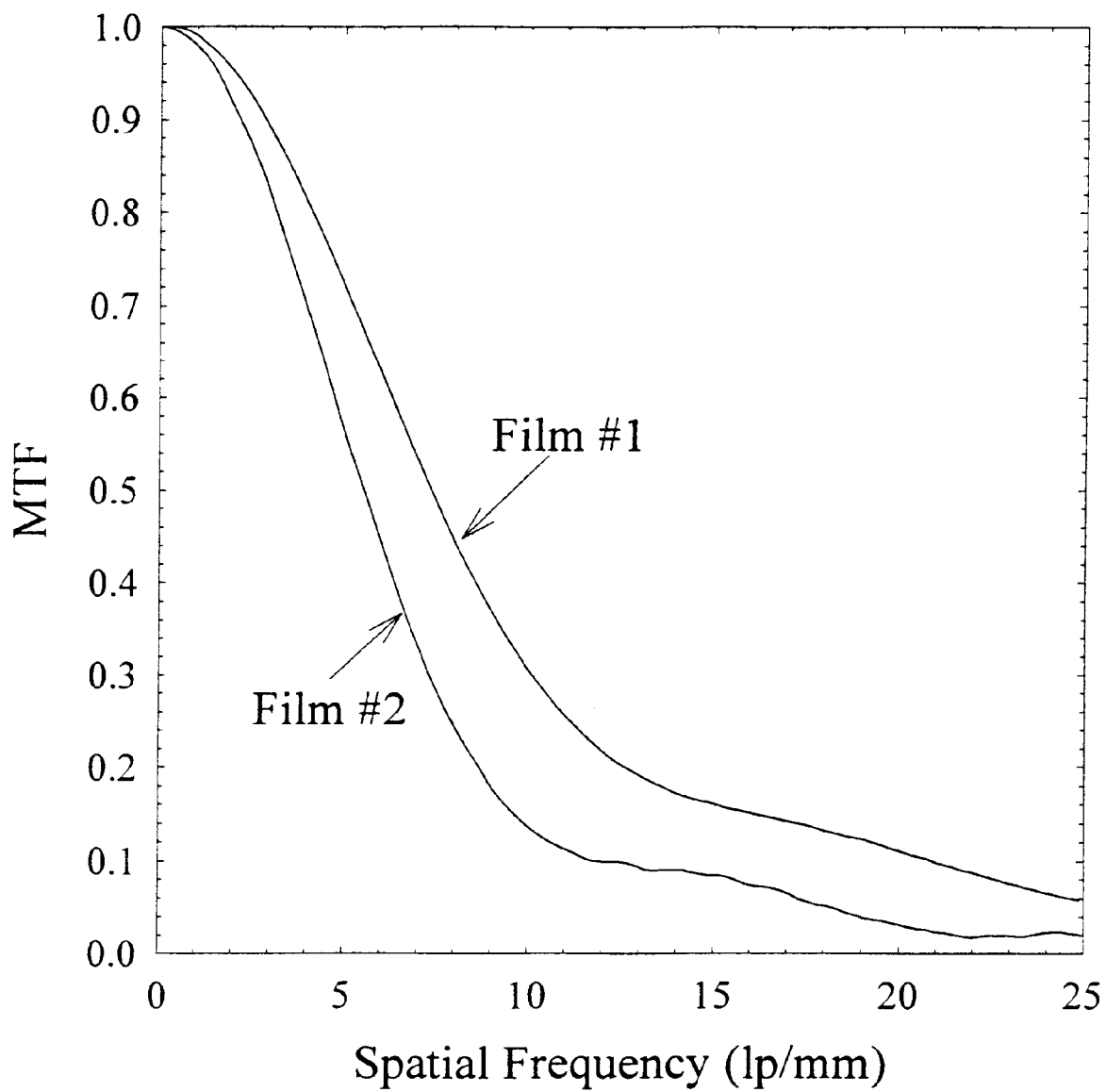
FIG. 17 shows measured modulation transfer curves for a specific single screen-dual film combination at an x-ray tube potential of 26 kV.

FIG. 17 shows the measured modulation transfer function (MTF) curves for the single screen-dual film combination at 26 kV. The MTF values for film #1 are excellent with values of 0.70, 0.31, 0.16 and 0.11 at spatial frequencies for 5, 10, 15 and 20 lp/mm, respectively.

In addition, images of the standard lead resolution bar pattern (Model 07-539, Nuclear Associates, Carle Place, N.Y.) were taken to obtain the limiting spatial resolution of the two films. The table below summarizes the measured limiting spatial resolution at 26 and 28 kV. The limiting spatial resolution is $\geq 20$ lp/mm and $\geq 16$ lp/mm for film #1 and film #2, respectively. These results are consistent with the MTF measurements.

| X-ray tube potential | Limiting spatial resolution (lp/mm) | |
| --- | --- | --- |
| (kVp) | Film #1 | Film #2 |
| 26 | >20 | 16.0 |
| 28 | >20 | 16.5 |

In summary, these results demonstrate experimentally that very high spatial resolution ($\geq 16$ lp/mm) can be achieved using a film which is exposed by light emerging from the transparent backing layer of a phosphor screen. Furthermore, this spatial resolution performance and high film contrast extend over a significantly increased exposure latitude with respect to prior mammographic techniques, demonstrating the advantages of the present invention for use in mammography.

It should be understood that the examples and embodiments described herein are for illustrative purposes only and that various modifications or changes in light thereof will be suggested to persons skilled in the art and are to be included within the spirit and purview of this application and the scope of the appended claims.

REFERENCES

U.S. Patents
U.S. Pat. No. 5,629,968 (Trauernicht, 1997)
U.S. Pat. No. 5,574,768 (McLean, 1997)
U.S. Pat. No. 4,394,737 (Komaki et al., 1983)
Other Publications
Corney, G. M. (1979) "Sensitometric Properties of Radiographic Films," In: *The Physics of Medical Imaging: Recording System Measurements and Techniques*, AAPM Medical Physics Monograph No. 3, A. G. Haus, ed. New York: American Institute of Physics, pg. 72–82.
Gershon-Cohen, J. (1960) "Technical improvements in breast roentgenography" *Am. J. Roentgenol Radium Ther Nucl Med* 84:224–226.
Haus, Arthur G. (1992) "Screen-Film Image Receptors and Film Processing," *Syllabus: A Categorical Course in Physics Technical Aspects of Breast Imaging*," Ed. A. G. Haus and M. J. Yaffe, RSNA Publications, Oakbrook, Ill., pg. 69–84.
Johns, P. C. and M. J. Yaffe (1987) "X-ray Characterization of Normal and Neoplastic Breast Tissues," *Phys. Med. Biol.* Vol. 32(6):675–695.
Ma, L. E. Fishell, B. Wright, W. Hanna, S. Allen, N. F. Boyd (1992) "A Controlled Study Of The Factors Associated With Failure To Detect Breast Cancer By Mammography," *J. Natl. Can Inst.* 84:781–785.
Maidment, A. M. A., R. Fahrig, M. J. Yaffe (1993) "Dynamic Range Requirement In Digital Mammography," *Med. Phys.* 20(6):1621–1633.
Sanada, S., K. Doi, X. W. Xu, F. F. Yin, M. L. Geiger, H. MacMahon(1991) "Comparison of imaging properties of a computed radiography system and screen-film systems" *Med Phys* 18:414–420.
Skubic, S. E. and P. P. Fatouros (1989) "The Effect Of Breast Composition On Absorbed Dose And Image Contrast," *Med. Phys.* 16:544–552.
Swank, R. K. (1973) "Absorption and noise in x-ray phosphors" *J. Appl. Phys.* 44:4199–4203.
Wyatt, C. C. (1980) "Xero and film mammography: two images with one exposure" *Radiol Technol* 51:621–625.

What is claimed is:

1. A method for x-ray imaging of a subject wherein said method comprises irradiating said subject such that radiation passing through said subject strikes a screen, said screen comprising a first side and a second side, wherein said screen then emits light from the first side of said screen which exposes a first film and emits light from the second side of said screen which exposes a second film, wherein said first and second films are exposed only by said screen.

2. The method, according to claim 1, wherein said first film and said second film are the same type of films, wherein a difference in the light intensity striking said first film and the light intensity striking the second film leads to a difference in the effective speed of said first film and the effective speed of said second film.

3. The method, according to claim 1, wherein said screen comprises a light emitting phosphor layer and a transparent backing layer.

4. The method, according to claim 3, wherein the thickness of said transparent backing layer is between about 2 μm to about 20 μm.

5. The method, according to claim 3, wherein the thickness of said transparent backing layer is between about 10 μm to about 15 μm.

6. The method, according to claim 3, wherein said transparent backing layer is less than or equal to 100 μm in thickness.

7. The method, according to claim 1, wherein said screen is a self-supporting screen.

8. The method according to claim 1, wherein said screen comprises a frame which provides structural support sufficient to allow a user to handle the screen.

9. The method, according to claim 3, wherein the thickness of the phosphor layer is less than 70 μm.

10. The method, according to claim 3, wherein the thickness of the phosphor layer is between about 15 μm to about 65 μm.

11. The method, according to claim 3, wherein the thickness of the phosphor layer is between about 25 μm to about 60 μm.

12. The method, according to claim 3, wherein the thickness of the phosphor layer is between about 35 μm to about 55 μm.

13. The method, according to claim 1, wherein the effective speeds of the said films are different by a factor ranging from about 1.0 to about 3.0.

14. The method, according to claim 3, wherein said screen further comprises a protective layer, wherein said phosphor layer is sandwiched between the protective layer and the transparent backing layer.

15. The method, according to claim 1, wherein the two films have partially overlapping exposure latitudes.

16. The method, according to claim 1, wherein said method is used for mammography.

17. The method, according to claim 1, wherein said films are single emulsion x-ray films.

18. The method, according to claim 1, wherein the thickness of the screen is between about 25 μm to about 70 μm.

19. The method, according to claim 1, wherein the thickness of the screen is between about 30 μm to about 65 μm.

20. The method, according to claim 1, wherein the thickness of the screen is between about 45 μm to about 60 μm.

21. The method, according to claim 1, wherein said screen comprises a light emitting phosphor layer and a backing layer, wherein the light absorption characteristic of the said backing layer controls the light intensity striking the second film.

22. A device for radiological imaging comprising a screen, said screen comprising a first side and a second side, wherein said device can accommodate a first film and a second film such that a single exposure to radiation causes said screen to emit light from the first side of said screen which exposes the first film and to emit light from the second side of said screen which exposes the second film, wherein said first and second films ale exposed only by said screen.

23. The device, according to claim 22, wherein said screen comprises a light emitting phosphor layer and a transparent backing layer.

24. The device, according to claim 23, wherein the thickness of said transparent backing layer is between about 2 μm to about 20 μm.

25. The device, according to claim 23, wherein the thickness of said transparent backing layer is between about 10 μm to about 15 μm.

26. The device, according to claim 23, wherein said transparent backing layer is less than or equal to 100 μm in thickness.

27. The device, according to claim 23, wherein said screen is a self-supporting screen.

28. The device, according to claim 22, wherein said first and second films are single emulsion x-ray films.

29. The device, according to claim 22, wherein the effective speeds of said first and second films are different by a factor ranging from about 1.0 to about 3.0.

30. The device, according to claim 23 wherein said screen comprises a frame which provides structural support sufficient to allow a user to handle the screen.

31. The device, according to claim 22, further comprising a marking means, wherein when said cassette is exposed to x-rays, each film produces a film image and at least one mark is produced on each film image in a manner to allow alignment of said film images with each other.

32. The method, according to claim 1, further comprising the step of: processing said exposed films to produce two corresponding digital images.

33. The method, according to claim 32, wherein the two digital images are scaled and aligned relative to each other.

34. The method, according to claim 33, further comprising the step of: searching each of the two digital images for the presence of image features indicative of the presence of tissue abnormality of the subject.

35. The method, according to claim 34, wherein the results of each of the two searches are used in combination to enhance the ratio of true positive to false positive abnormality identification.

36. The method, according to claim 33, further comprising the step of: combining the two digital images into a combined digital image within which the signal to noise ratio of each pixel is optimized.

37. The method, according to claim 36, further comprising the step of: searching the combined digital image for the presence of image features indicative of the presence of tissue abnormality of the subject.

38. The method, according to claim 1, wherein said screen is a scintillating fiber optic plate.

39. The device, according to claim 22, wherein said screen is a scintillating fiber optic plate.

40. The device, according to claim 22, wherein said screen is connected to the device by a connecting means permitting movement of said screen to facilitate the placement of films.

41. The method, according to claim 14, wherein the thicknesses of the protective layer and the transparent backing layer are selected such that approximately the same limiting resolution is achieved for the first film and the second film.

42. The device, according to claim 23, wherein said screen further comprises a protective layer, wherein said phosphor layer is sandwiched between the protective layer and the transparent backing layer, and wherein the thicknesses of the protective layer and the transparent backing layer are selected such that approximately the same limiting resolution is achieved for the first film and the second film.

43. The method, according to claim 21, wherein said backing layer comprises a light absorbing dye.

44. The device, according to claim 22, wherein said screen comprises a light emitting phosphor layer and a backing layer, wherein the light absorption characteristic of said backing layer controls the light intensity striking the second film.

45. The device, according to claim 44, wherein said backing layer comprises a light absorbing dye.

46. The device, according to claim 22, wherein said first film and said second film are the same type of films, wherein a difference in the light intensity striking said first film and the light intensity striking the second film leads to a difference in the effective speed of said first film and the effective speed of said second film.

* * * * *

UNITED STATES PATENT AND TRADEMARK OFFICE
CERTIFICATE OF CORRECTION

PATENT NO. : 6,158,888  
DATED : December 12, 2000  
INVENTOR(S) : James K. Walker, Zhenxue Jing Page 1 of 1

It is certified that error appears in the above-identified patent and that said Letters Patent is hereby corrected as shown below:

Column 8,  
Line 38, "film(s). is connection" should read -- film(s). This connection --.

Column 13,  
Line 61, "#1 film #1" should read -- #1/film #1 --.

Signed and Sealed this

Sixteenth Day of October, 2001

Attest:

Nicholas P. Godici

NICHOLAS P. GODICI  
*Acting Director of the United States Patent and Trademark Office*

*Attesting Officer*

UNITED STATES PATENT AND TRADEMARK OFFICE
CERTIFICATE OF CORRECTION

PATENT NO.   : 6,158,888  
DATED        : December 12, 2000  
INVENTOR(S)  : James K. Walker and Zhenxue Jing Page 1 of 1

It is certified that error appears in the above-identified patent and that said Letters Patent is hereby corrected as shown below:

<u>Title page,</u>  
Item [63], Related U.S. Application Data, "PCT/US97/00015" should read -- PCT/US97/15589 --.

Signed and Sealed this

Twenty-seventh Day of May, 2003

JAMES E. ROGAN  
*Director of the United States Patent and Trademark Office*